(12) United States Patent
Hiraguchi

(10) Patent No.: US 7,290,729 B2
(45) Date of Patent: Nov. 6, 2007

(54) RECORDING TAPE CARTRIDGE

(75) Inventor: Kazuo Hiraguchi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 10/446,140

(22) Filed: May 28, 2003

(65) Prior Publication Data

US 2004/0011908 A1    Jan. 22, 2004

(30) Foreign Application Priority Data

May 29, 2002  (JP) .............................. 2002-156421

(51) Int. Cl.
*G11B 23/07* (2006.01)
(52) U.S. Cl. ............... 242/326.1; 242/348; 360/132
(58) Field of Classification Search ............... 242/326, 242/326.1, 338, 338.1, 338.2, 340, 346, 348, 242/348.2, 326.2; 360/92, 132
See application file for complete search history.

(56) References Cited

U.S. PATENT DOCUMENTS

| | | | | |
|---|---|---|---|---|
| 3,758,048 | A * | 9/1973 | Sugaya et al. ............... | 242/340 |
| 3,945,040 | A * | 3/1976 | Staar ........................ | 242/326.1 |
| 5,204,794 | A   | 4/1993 | Yoshida | |
| 5,294,072 | A * | 3/1994 | East et al. ................... | 242/346 |
| 5,297,755 | A * | 3/1994 | Felde et al. ................. | 242/346 |
| 5,371,640 | A * | 12/1994 | Kvifte et al. ................. | 360/92 |
| 5,666,337 | A * | 9/1997 | Dang et al. .................... | 360/92 |
| 5,673,155 | A * | 9/1997 | Motoyama et al. ......... | 242/338 |
| 5,926,351 | A * | 7/1999 | Abe ........................... | 360/132 |
| 6,095,445 | A * | 8/2000 | Hentrich .................... | 242/332.4 |
| 6,299,087 | B1* | 10/2001 | Koizumi ..................... | 242/346 |
| 6,354,527 | B1* | 3/2002 | Krula ......................... | 242/340 |
| 6,481,658 | B1  | 11/2002 | Shiga et al. | |
| 6,628,479 | B1* | 9/2003 | Rambosek .................. | 360/132 |
| 6,764,037 | B2* | 7/2004 | Hancock et al. ............ | 242/348 |

FOREIGN PATENT DOCUMENTS

JP    2000-331403 A    11/2000

* cited by examiner

*Primary Examiner*—William A. Rivera
(74) *Attorney, Agent, or Firm*—Sughrue Mion Pllc.

(57) ABSTRACT

A recording tape cartridge which can prevent positional offset of a case with respect to a cartridge accommodating device. Accompanying operation of loading the cartridge in an arrow A direction into a drive device, a door is moved to a side of opening an opening while an operation projection is engaged by an engagement projection. At this time, a pushing/engaging member of the drive device enters into a cell retention notch, and pushes a push surface and engages with an engagement surface. In this way, at the case, a moment in an arrow E direction around a region of engagement is offset, and the case is prevented from being coming out from the drive device. An inclined surface permits advance and withdrawal of the pushing/engaging member into and from the notch.

13 Claims, 12 Drawing Sheets

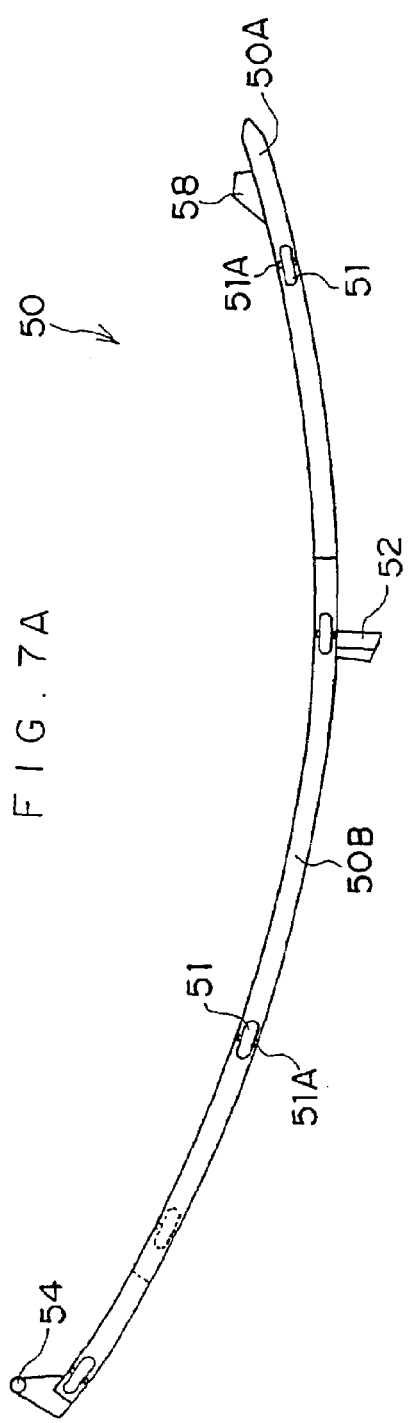
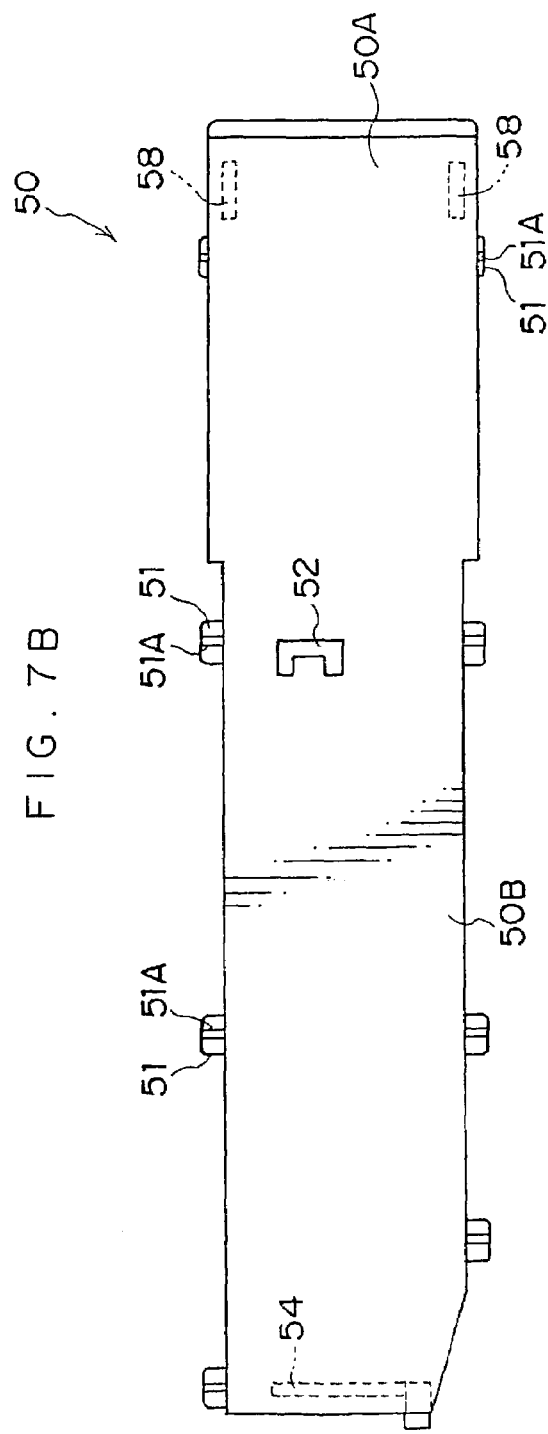

RECORDING TAPE CARTRIDGE

BACKGROUND OF THE INVENTION

1. Field of the Invention

The present invention relates to a recording tape cartridge which rotatably accommodates a reel on which a recording tape, such as a magnetic tape or the like, is wound.

2. Description of the Related Art

Recording tapes, such as magnetic tapes and the like, are used as external recording media for computers and the like. Recording tape cartridges are used which accommodate a single reel on which is wound a recording tape which requires little space for storage and on which a large amount of information can be recorded. In a recording tape cartridge, a single reel on which a recording tape is wound is rotatably accommodated within a case which is formed by joining together an upper case and a lower case which are molded of a resin material. An opening is formed in the case. The recording tape is pulled-out from this opening, and is taken-up onto a take-up reel of a drive device.

The opening is opened and closed by a door which is a shielding member, so that dust and the like do not enter in from the opening and adhere to the recording tape. Namely, when the recording tape cartridge is not in use, the opening is closed by the door. When the recording tape cartridge is to be used, the door is moved such that the opening is opened.

As a recording tape cartridge equipped with a door, a structure is known which is provided with an opening provided in a side wall of a case which side wall runs along the direction of loading the recording tape cartridge into a drive device, a door which slides at the inner side of the side wall and along the loading direction so as to open and close the opening, a spring urging the door in a direction of closing the opening, and an operation portion which is provided at the door and which, due to the operation of the case being loaded into a drive device, slides the door in the direction of opening the opening while engaging with an opening/closing member of the drive device.

In accordance with this structure, merely by the operation of loading the case (i.e., the recording tape cartridge) into the drive device, the operation portion provided at the door slides the door with respect to the case while engaging with the opening/closing member which is fixed to the drive device (i.e., which moves relatively to the case), such that the opening is opened. In this way, it suffices to merely fix the opening/closing member at a position of the drive device at which the opening/closing member can engage with the operation portion, and the structure is simple.

However, in the above-described conventional recording tape cartridge, when the operation portion of the door engages the opening/closing member of the drive device at the time of opening the opening, a rotational moment around the region of this engagement arises, and a problem arises in that the case (i.e., the recording tape cartridge) rotates around this region of engagement and becomes tilted with respect to the direction of loading. In particular, because the opening is opened against the urging force of the spring, this rotational moment (the pushing-in force in the loading direction) is large, and it is easy for the case to become tilted within the drive device (it is easy for the position of the case to become offset).

If the case is pushed into the drive device in this state, there is the concern that the case will rub against the interior of the drive device, and the case will become scratched or abrasion powder will be generated within the drive device, or the case will become stuck within the drive device.

Thus, in order to offset this rotational moment, a structure has been conceived of in which an engagement member of the drive device is engaged with a position, of the loading direction leading side surface (the front surface) of the lower case, which position is set apart from the side wall in which the opening is formed. While this engaged state is maintained, the case (together with the engagement member) move in the loading direction and open the opening.

However, in a case which is formed by joining together an upper case and a lower case molded of a resin material as described above, the outer surface which includes the aforementioned front surface is a design surface at which crimping processing and the like are carried out, and the draft for removing the case from a mold after molding is large and the dimensional accuracy is low. When the engagement member is engaged at a position of this front surface of the case which position is set apart from the opening, at the case, the aforementioned rotational moment is offset, but the positional accuracy of the opening with respect to the drive device (which is most important in terms of function) is low. Moreover, in a recording tape cartridge having the above-described structure, movement in the direction of pulling the case out from the drive device is permitted. Thus, there are cases in which positional offset of the case (the opening) with respect to the drive device occurs due to the urging force of the spring which urges the door, or the like.

Japanese Patent Application Laid-Open (JP-A) No. 2000-331403 has disclosed a structure in which a lock hole, which an anchor means (a lock block or the like) engages, is formed at the case. The anchor means is for preventing the recording tape cartridge from being pulled-out from the drive device. After the opening is opened, the anchor means anchors the recording tape cartridge to the drive device. When the aforementioned positional offset occurs at the point in time when the opening is opened, there are cases in which the anchor means does not correctly engage with the lock hole. Moreover, with an anchor means which anchors the case after the opening has been opened, the aforementioned rotational moment cannot be offset.

Further, in an automatic cartridge conveying device (a library device), a large number of recording tape cartridges are accommodated individually in holder portions, and are automatically conveyed from the holder portions to drive devices as needed. However, in this case as well, with a conventional recording tape cartridge, movement in the direction of pulling the cartridge out from the holder portion is permitted. Thus, there are cases in which positional offset of the case with respect to the holder portion arises.

SUMMARY OF THE INVENTION

In view of the aforementioned, an object of the present invention is to provide a recording tape cartridge which can prevent positional offset of a case with regard to a cartridge accommodating device.

Here, "cartridge accommodating device" refers to a device which accommodates a recording tape cartridge in a positioned state, and encompasses drive devices, automatic cartridge conveying devices (library devices) in which a plurality of recording tape cartridges are individually accommodated and are conveyed to drive devices as needed, or the like.

In order to achieve the above object, in accordance with a first aspect of the present invention, there is provided a tape cartridge which can be inserted into a tape drive having an opening member and an engagement member which can operatively engage the tape cartridge when the tape cartridge is inserted in the tape drive, the tape cartridge comprising: (a) a case; (b) a tape access opening provided at one side of the case with respect to a center line of the case, which center line extends in a cartridge insertion direction; (c) a shielding member able to move reciprocally between a closing position for closing the tape access opening and an opening position for opening the tape access opening; (d) an operation portion, which, when the cartridge is inserted, cooperates with the opening member of the tape drive to move the shielding member toward the opening position; and (e) a concave portion provided at another side of the case with respect to the center line, and when the cartridge is inserted, the concave portion is able to cooperate with the engagement member of the tape drive, and the concave portion has a push surface, an engagement surface and an inclined surface.

In accordance with another aspect of the present invention, there is provided a tape drive into which a tape cartridge is inserted and from which the tape cartridge is removed, and which carries out at least one of reading of data and writing of data, the tape drive comprising: an opening member which can operatively engage with the tape cartridge when the tape cartridge is inserted; and an engagement member which can operatively engage with the tape cartridge when the tape cartridge is inserted, wherein the tape has (a) a case; (b) a tape access opening provided at one side of the case with respect to a center line of the case, which center line extends in a cartridge insertion direction; (c) a shielding member able to move reciprocally between a closing position for closing the tape access opening and an opening position for opening the tape access opening; (d) an operation portion, which, when the cartridge is inserted, cooperates with the opening member of the tape drive to move the shielding member toward the opening position; and (e) a concave portion provided at another side of the case with respect to the center line, and when the cartridge is inserted, the concave portion is able to cooperate with the engagement member of the tape drive, and the concave portion has a push surface, an engagement surface and an inclined surface.

BRIEF DESCRIPTION OF THE DRAWINGS

FIGS. 7A and 7B are views showing a door forming the recording tape cartridge relating to the embodiment of the present invention, where FIG. 7A is a plan view and FIG. 7B is a side view.

DETAILED DESCRIPTION OF THE PREFERRED EMBODIMENTS

Hereinafter, a recording tape cartridge 10 relating to an embodiment of the present invention will be described on the basis of FIGS. 1 through 10. First, the basic overall structure of the recording tape cartridge 10 will be described. Then, an opening, a door which serves as a shielding member, and a cell retention notch 60 serving as a concave portion which is a main portion of the present invention, will be described. Note that, for convenience of explanation, the direction of loading the recording tape cartridge 10 into a drive device, which is denoted by arrow A, is the forward direction (front side) of the recording tape cartridge 10. The directions of arrow B and arrow C, which are orthogonal to the direction of arrow A, are the rightward direction and the leftward direction, respectively.

(Overall Structure of Recording Tape Cartridge)

Figure 1:
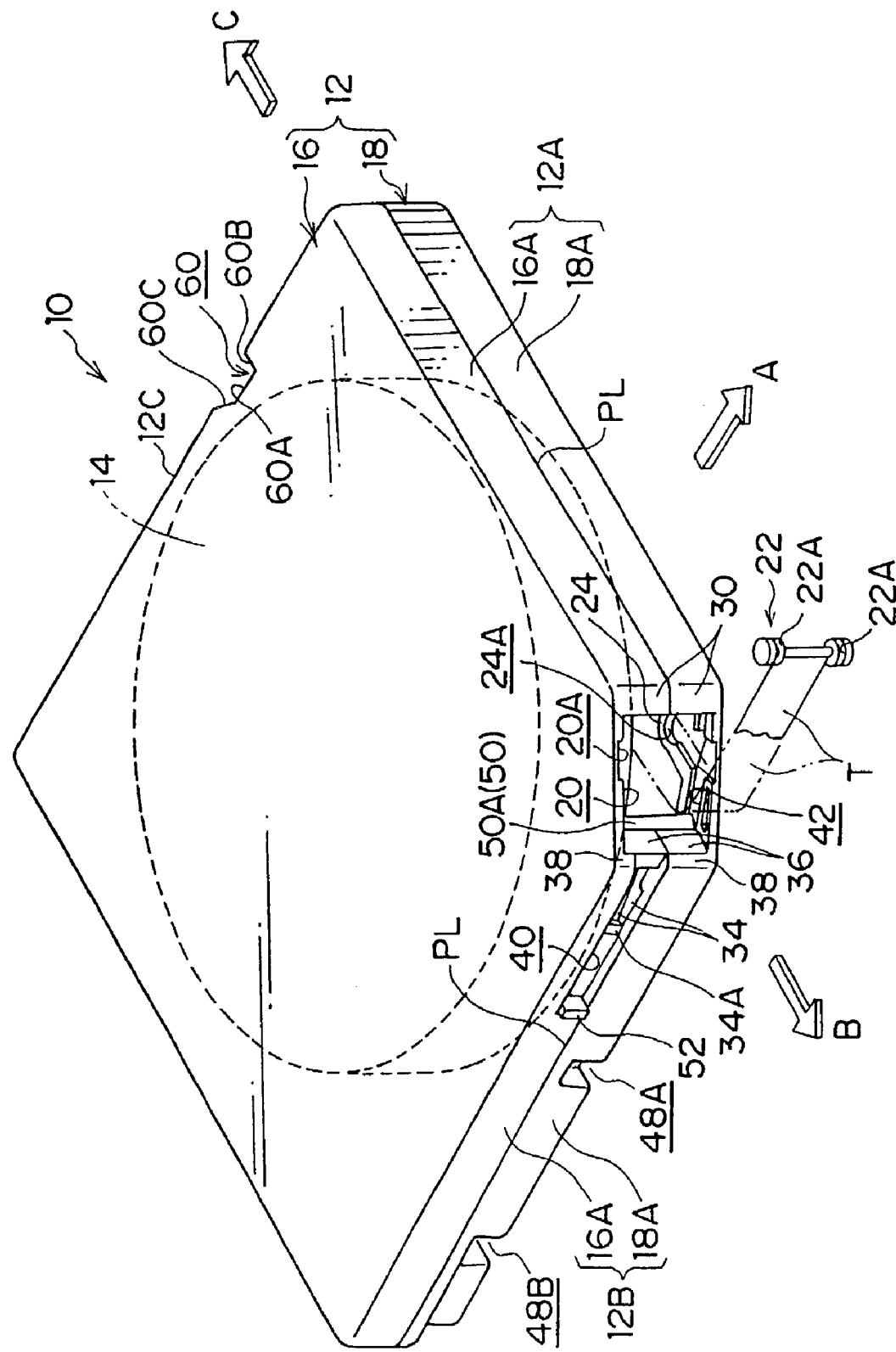
FIG. 1 is a perspective view showing the overall structure of a recording tape cartridge relating to an embodiment of the present invention.
Figure 2:
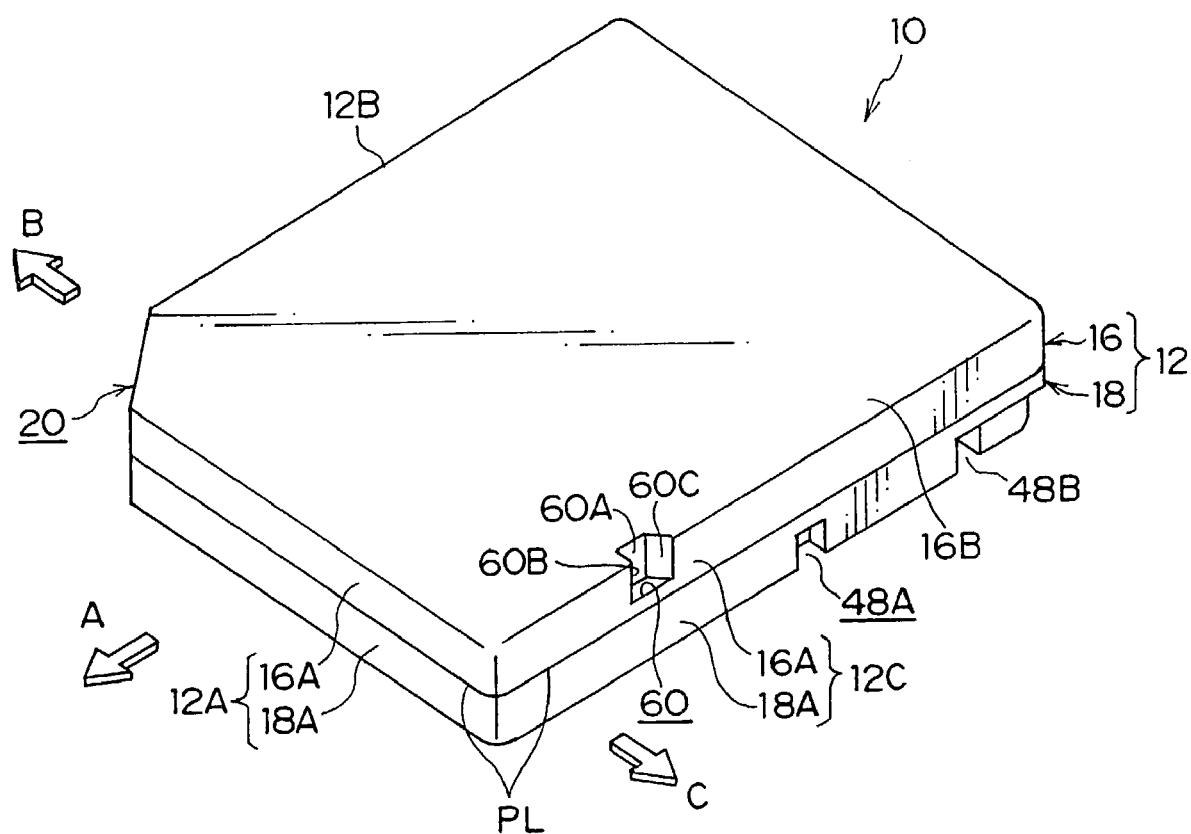
FIG. 2 is a perspective view, as seen from another direction, showing the overall structure of the recording tape cartridge relating to the embodiment of the present invention.
Figure 3:
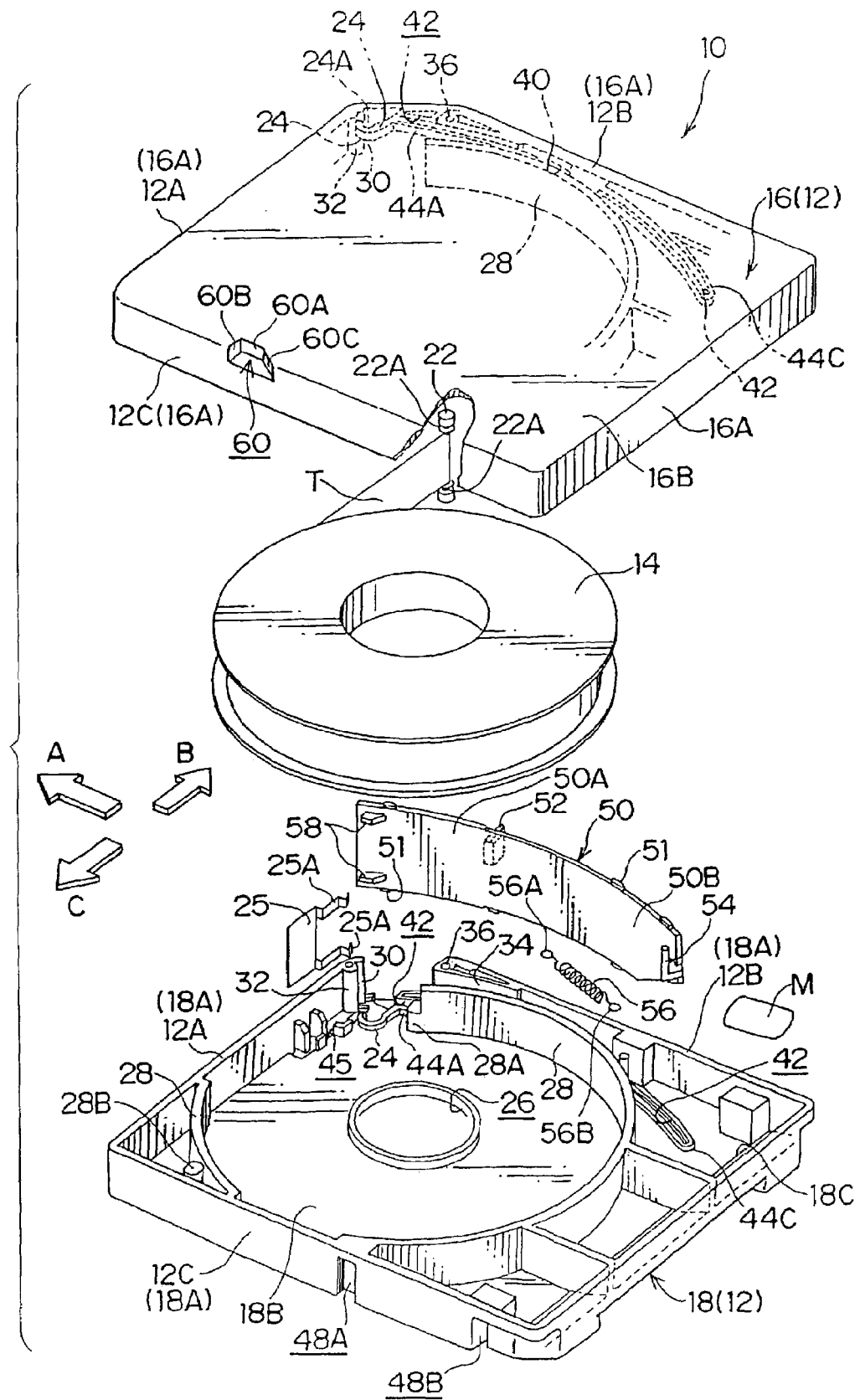
FIG. 3 is an exploded perspective view of the recording tape cartridge relating to the embodiment of the present invention.

The overall structure of the recording tape cartridge 10 is shown in perspective views in FIGS. 1 and 2, and a schematic exploded perspective view of the recording tape cartridge 10 is shown in FIG. 3. As shown in these figures, the recording tape cartridge 10 is structured such that a single reel 14, on which is wound a magnetic tape T serving as a recording tape which is an information recording/playback medium, is rotatably accommodated within a case 12 which is substantially rectangular as seen in plan view.

The case 12 is formed by joining together an upper case 16 and a lower case 18 with peripheral walls 16A, 18A thereof opposing each other. The front right corner portion of each of the upper case 16 and the lower case 18, which is one corner portion at the leading side in the direction of loading the recording tape cartridge 10 into a drive device, is cut off. A space for accommodating the reel 14, on which the magnetic tape T is wound, is provided at the interior of the case 12. Further, the corner portion of each of the upper case 16 and the lower case 18, at which corner portion the peripheral walls 16A, 18A have been cut, forms an opening 20 for pulling-out of the magnetic tape T.

A leader pin 22, which is pulled-out while being anchored (engaged) by a pull-out means of a drive device, is connected to the free end of the magnetic tape T which is pulled out from the opening 20. An annular groove 22A is formed in each of the end portions of the leader pin 22 which project out further than the transverse direction end portions of the magnetic tape T. The annular grooves 22A are anchored by hooks or the like of the pull-out means. In this way, the hooks or the like do not contact and scratch the magnetic tape T at the time of pulling-out the magnetic tape T.

A pair of upper and lower pin stands 24, which position and hold the leader pin 22 within the case 12, are provided at the inner side of the opening 20 of the case 12. The pin stands 24 are formed in semicylindrical shapes which open in the direction of arrow B. The both end portions of the leader pin 22, which is in a state of standing upright, are held in concave portions 24A of the pin stands 24. The pin stands 24 are continuous with ribs 44 which will be described later.

A plate spring 25 is fixed in the vicinity of the pin stands 24. The plate spring 25 engages with the upper and lower end portions of the leader pin 22, and holds the leader pin 22 at the pin stands 24. When the leader pin 22 enters into and exits out from the pin stands 24, arm portions 25A of the plate spring 25 are appropriately elastically deformed, such that movement of the leader pin 22 is permitted.

Further, a gear opening 26, which is for exposing an unillustrated reel gear of the reel 14 to the exterior, is formed in the central portion of the lower case 18. The reel 14 is driven to rotate within the case 12 by the reel gear meshing with a driving gear of a drive device. Further, the reel 14 is held so as to not joggle by play restricting walls 28 which partially project out at the inner surfaces of the upper case 16 and the lower case 18, and which serve as inner walls which are on a circular locus which is coaxial with the gear opening 26.

A bag portion 28A, in which a hole for position regulation is formed, is continuous with the end portion of the play restricting wall 28 in a vicinity of the opening 20. Further, a bag portion 28B, in which is formed a hole for position regulation which is a long hole, stands erect in the space sandwiched between the front left corner portion of the case 12 and the play restricting wall 28. The bag portions 28A, 28B are disposed on a single straight line which extends along the direction of arrow B. End portions of the play restricting walls 28, except for the end portion thereof at which the bag portion 28A is continuous, are continuous with the peripheral wall 16A or the peripheral wall 18A of the case 12, so as to partition the outer sides of the play restricting walls 28 and the space at which the reel 14 is set.

A memory board M, which stores various types of information, is set at the rear right portion of the lower case 18 for each recording tape cartridge 10. A portion of a rear wall 18C forming the peripheral wall 18A is inclined at a predetermined angle and the memory board M is disposed so as to be inclined at a predetermined angle, such that sensing is possible at a drive device which reads from the bottom surface side and at a library device which reads from the rear surface side.

(Opening, and Structure of Case in Vicinity of Opening)

As described above, the opening 20 is formed by cutting off the front right corner portion of the case 12. The plane of opening of the opening 20 is directed in the direction of arrow A and in the direction of arrow B.

Figure 4:
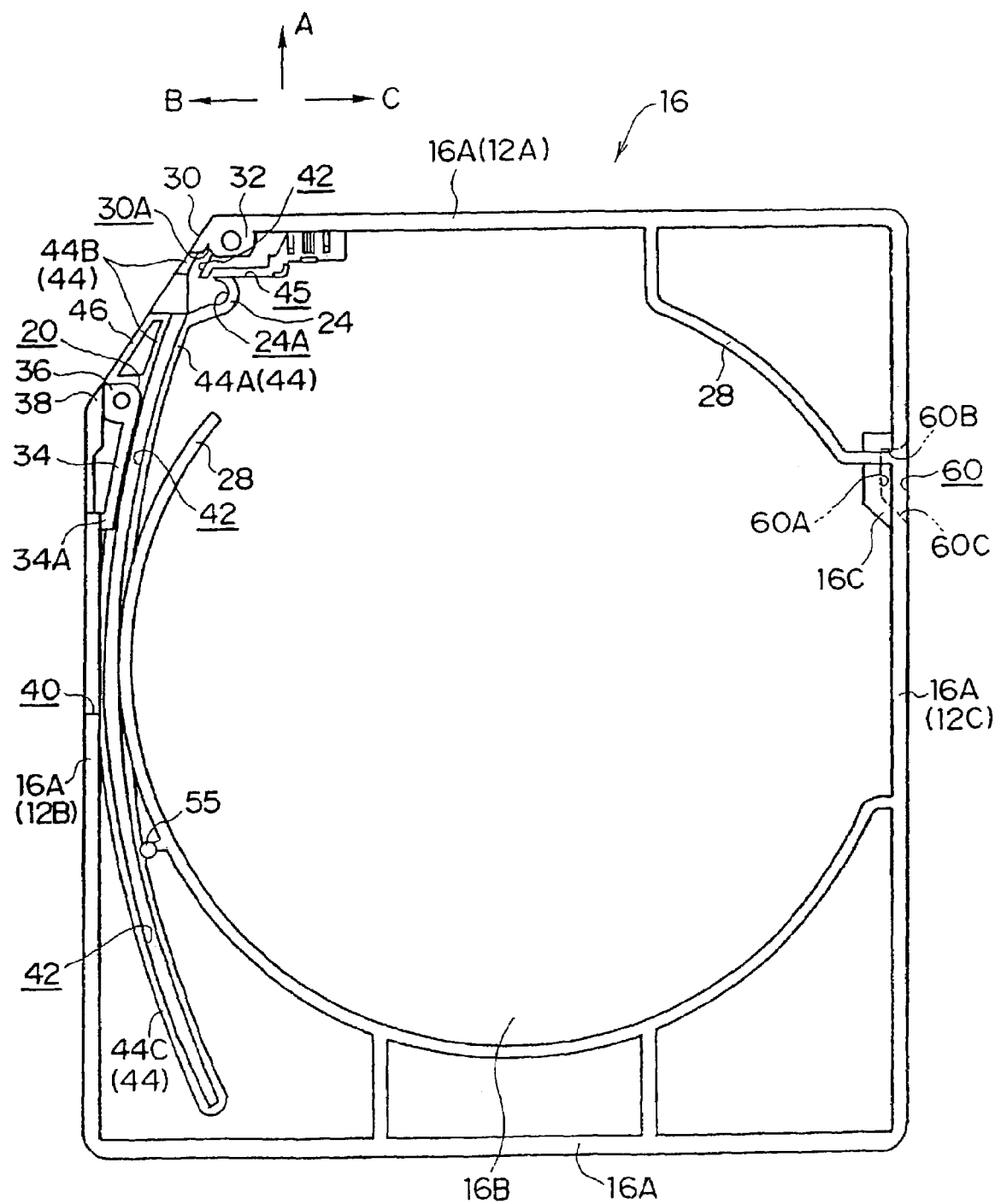
FIG. 4 is a bottom view of an upper case forming the recording tape cartridge relating to the embodiment of the present invention.
Figure 5:
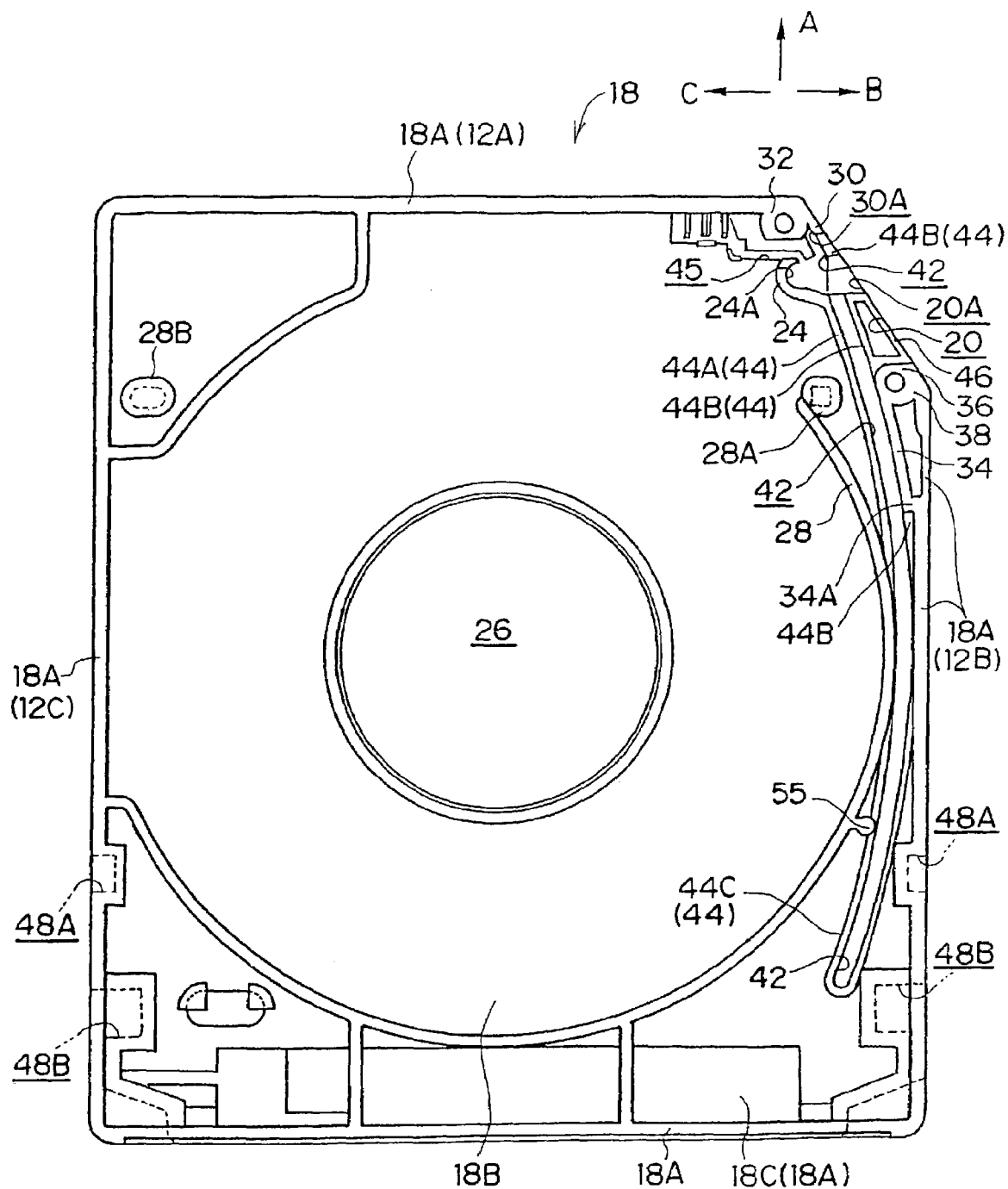
FIG. 5 is a plan view of a lower case forming the recording tape cartridge relating to the embodiment of the present invention.

As shown in FIG. 4 (which is a bottom view of the upper case 16) and in FIG. 5 (which is a plan view of the lower case 18), a pair of upper and lower screw bosses 32 and a pair of upper and lower screw bosses 36 are provided at the front and rear edge portions of the opening 20, respectively.

The screw bosses 32, 36, as well as other screw bosses which are not illustrated, are for the screwing-in of screws which join the upper case 16 and the lower case 18.

The screw bosses 32, which are positioned at the front edge portion of the opening 20, are continuous with the right end portion of a front wall 12A of the case 12 (the front wall 12A is the portions of the peripheral walls 16A, 18A whose outer surfaces are directed in the direction of arrow A), and are continuous with a pair of upper and lower dustproofing walls 30 which are short and are bent along the plane of opening of the opening 20 from the right end portion of the front wall 12A. Concave portions 30A, into which the distal end portion of a door 50 which will be described later enters, are formed between the screw bosses 32 and the dustproofing walls 30.

The screw bosses 36, which are positioned at the rear edge portion of the opening 20, are continuous with bent walls 38 and with the front end portions of a pair of upper and lower arc-shaped walls 34. The bent walls 38 are formed such that the front end portion of a right wall 12B of the case 12 (the right wall 12B is the right side walls of the peripheral walls 16A, 18A which run along the direction of arrow A) is bent substantially along the plane of opening of the opening 20. The arc-shaped walls 34 are provided at the inner side of the right wall 12B. The upper and lower arc-shaped walls 34 are formed in an arc-shape which, in plan view, substantially corresponds to (the locus of movement of) the outer peripheral surface of the door 50 which will be described later. The upper and lower arc-shaped walls 34 extend rearward from the screw bosses 36 by a predetermined length, and are continuous with the right wall 12B (the peripheral wall 16A or the peripheral wall 18A) via short connecting walls 34A at the rear portions thereof.

Figure 6:
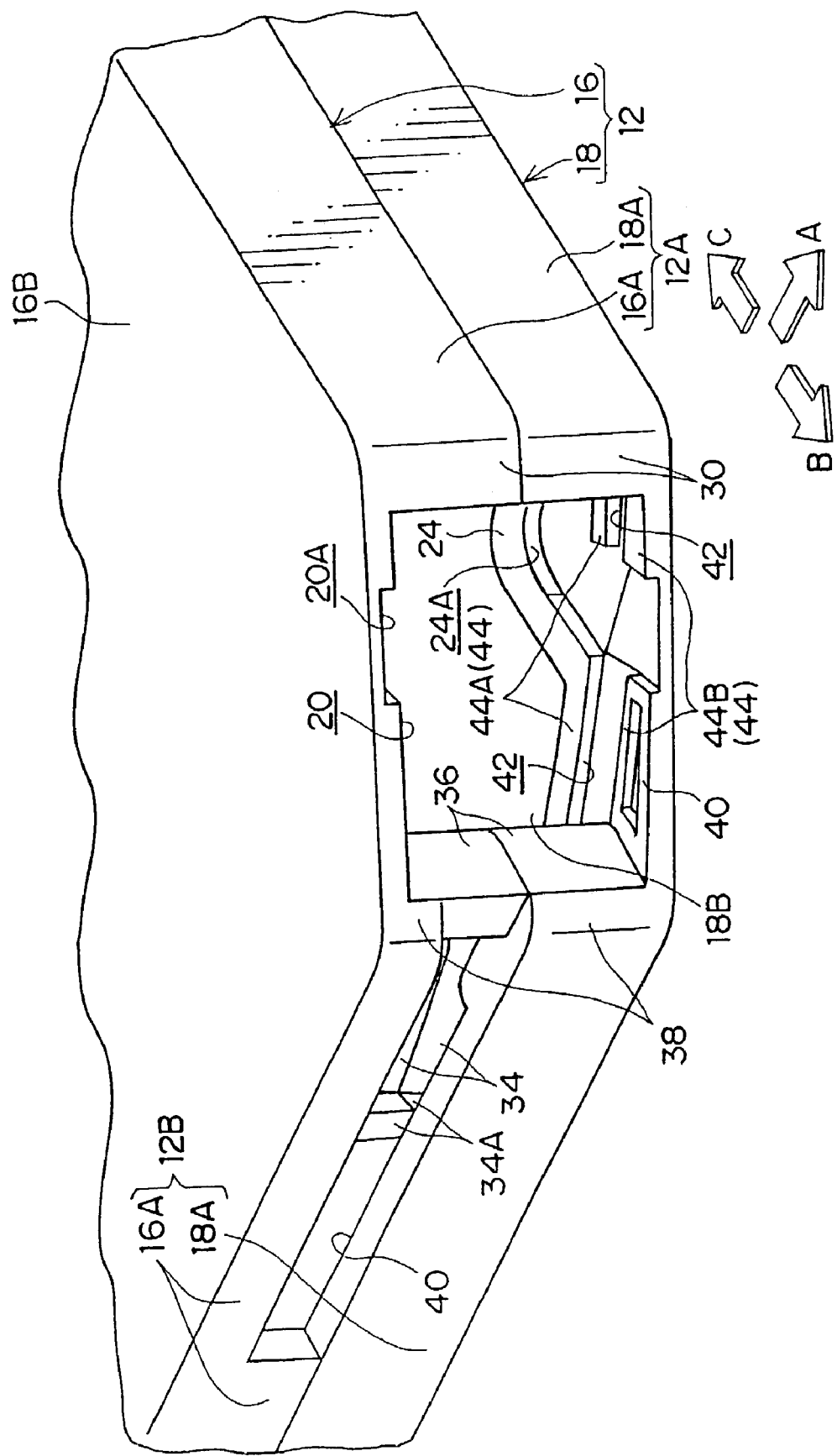
FIG. 6 is a perspective view showing, in an enlarged manner, an opening and a slit of the recording tape cartridge relating to the embodiment of the present invention.

As shown in FIG. 6 as well, a slit 40, which is of a predetermined length and serves as a window portion which communicates the interior and the exterior of the case 12, is formed in the right wall 12B of the case 12. The slit 40 is for exposing an operation projection 52 of the door 50 which will be described later. The slit 40 is formed by cutting out the lower portion of the peripheral wall 16A which forms the right wall 12B. The slit 40 opens toward the front as well by also cutting out the lower portion of the bent wall 38 of the upper case 16. Namely, the lower end portion of the slit 40 is prescribed by the peripheral wall 18A and the top end surface of the bent wall 38 of the lower case 18. In this way, the slit 40 is positioned above an abutment portion (parting line PL) between the upper case 16 and the lower case 18, and corresponds to the cell retention notch 60 (which will be described later) which is positioned above the parting line PL.

The upper and lower ends of the slit 40 are prescribed by a portion of the peripheral wall 16A which also functions as a rib, and by the peripheral wall 18A. Thus, the rigidity of the case 12 is maintained, which is preferable in terms of the drop strength. Moreover, the slit 40 is provided independently of the opening 20, with the screw bosses 36 being disposed between the slit 40 and the opening 20. Thus, the rigidity of the corner portion at the rear edge of the opening 20 is high, which is even more preferable in terms of the drop strength.

Returning to FIGS. 4 and 5, a guide groove 42 which guides the door 50 is provided in each of the upper case 16 and the lower case 18 forming the case 12. The groove walls of the guide grooves 42 are structured by the ribs 44 standing erect at a ceiling plate 16B of the upper case 16 or a bottom plate 18B of the lower case 18, the right wall 12B (either the peripheral wall 16A or the peripheral wall 18A), and the play restricting walls 28. The guide grooves 42 are formed without making the ceiling plate 16B or the bottom plate 18B thinner.

Each guide groove 42 is formed in an arc-shape which runs along a predetermined circumference whose proximal end is the concave portion 30A and which reaches the right rear corner portion of the case 12. This predetermined circumference is determined so as to pass (thread its way through) at the outer side of the screw bosses 32, the inner side of the screw bosses 36, and between the right wall 12B and the play restricting walls 28. In the present embodiment, the central position of this predetermined circumference (i.e., the center of rotation of the door 50 which will be described later) is set such that the left-right direction position (coordinate) thereof substantially coincides with a position further toward the outer side than the left end of the case 12, and the front-back direction position (coordinate) thereof substantially coincides with the center of rotation of the reel 14 (the axial center of the play restricting walls 28).

Namely, at the portion where the play restricting walls 28 are the closest to the right wall 12B, the play restricting walls 28 and the right wall 12B form the groove walls of the guide grooves 42. The rear edge of the slit 40 is positioned slightly toward the rear of this portion (by an amount substantially corresponding to the thickness of the operation projection 52).

At the rib 44 which forms the guide groove 42, a rib 44A which forms the front half portion at the inner side of each guide groove 42 is cut-out at the right of the pin stand 24, and the rear edge portion of this cut-out portion is continuous with the pin stand 24. In this way, the guide groove 42 and the concave portion 24A are continuous. On the other hand, the front edge portion of the cut-out portion of the rib 44A is separated from the end portion of the pin stand 24, and forms a portion of a spring groove 45 at which the arm portion 25A of the plate spring 25 is disposed. The outer surface of the rear end of this rib 44A is continuous so as to circumscribe the play restricting wall 28.

A rib 44B, which forms the front half portion at the outer side of each guide groove 42, also is cut-out at the right of the pin stand 24. Portions, at the ceiling plate 16B and the bottom plate 18B, which are further toward the right side than an imaginary line which is orthogonal to the direction of arrow B and connects the front edge of this cut-out portion of the rib 44B and the rear edge of the cut-out portion of the rib 44A, form taper openings 20A which guide the leader pin 22 into the case 12. Moreover, a rib 46, which is formed along the rear edge of the taper opening 20A, the front edge of the screw boss 36, and the plane of opening of the opening 20, respectively, is continuous with the rib 44B. In this way, the strength in the vicinity of the opening 20 can be ensured or improved. The intermediate portion of the rib 44B passes slightly more inwardly than the inner surface of the arc-shaped wall 34. The rear end portion of the rib 44B is continuous so as to inscribe the right wall 12B at the rear of the connecting wall 34A.

Moreover, at a rear end of a rib 44C, which forms the rear half portion of each guide groove 42, the rib 44C bends back in a substantial U shape. At the front end of the rib 44C, the inner side portion and the outer side portion are continuous so as to circumscribe the play restricting wall 28 and inscribe the right wall 12B, respectively. Moreover, the rib 44C of the upper case 16 is formed to be longer than the rib 44C of the lower case 18. (Namely, at the upper case 16, the rear end of the rib 44C, which is closed in a substantial U shape, is positioned further toward the rear than that at the lower case 18.) This is in order for the rib 44C to not interfere with the memory board M and the door 50 (which are provided at the right wall 12B side), because the rear wall 18C (the peripheral wall 18A) of the lower case 18 is formed as an inclined surface. Note that the rear end portions of the guide grooves 42, which are closed in substantial U shapes by the ribs 44C, can engage with convex portions 51 (to be described later) which are positioned the furthest rearward at the top and bottom of the door 50, in order to restrict further rearward movement of the door 50.

Further, at the rib 44 forming each guide groove 42, the ribs 44A and 44B, which are the substantially front half portion of the rib 44, are formed to be lower than the rib 44C which is the substantial rear half portion of the rib 44. For example, the height of the ribs 44A, 44B from the ceiling plate 16B or the bottom plate 18B is 1 mm, and the corresponding height of the rib 44C is 1.5 mm. This is in order to ensure space, in the vertical direction, for entry of the pull-out means of the drive device which engages and pulls out the leader pin 22. Thus, as will be described later, at the front half portion of the door 50 (at least the portion of the door 50 which closes the opening 20), the plate width (height) is formed to be larger (taller). Moreover, the heights of the pin stands 24 and the ribs 46 are set to be equal to those of the ribs 44A, 44B.

A pair of top and bottom spring catching pins 55 are provided at the longitudinally central portion of the inner side portion of the rib 44C. The spring catching pins 55 are continuous with the play restricting walls 28. The spring catching pin 55 at the lower case 18 side is formed to be longer. One end side annular portion 56A of a coil spring 56 which will be described later catches on the portion of this spring catching pin 55 which projects higher than the play restricting wall 28. The coil spring 56 is prevented from falling out due to the short spring catching pin 55 at the upper case 16 side abutting the spring catching pin 55 at the lower case 18 side.

Pairs of left and right concave portions 48A, 48B, which are positioned further toward the rear than the rear edge of the slit 40, are provided at the case 12. The concave portions 48A, for example, form engagement portions which a pull-in means of the drive device engages. The bottom (downwardly-facing) surfaces of the concave portions 48A form reference surfaces for positioning within the drive device. The concave portions 48B form engagement portions which a grasping means of a library device engages.

The case 12 is formed by the above-described upper case 16 and lower case 18 being fixed (joined) together by unillustrated screws being screwed into the screw bosses 32, 36 and other screw bosses from beneath, in a state in which the peripheral walls 16A, 18A of the upper case 16 and the lower case 18 abut one another. As an example, the diameter of the thread ridge at the screw is φ 2.0 mm, and the outer diameter of the screw bosses 32, 36 is φ 4.0 mm. In this way, the corner portions at the both ends of the opening 20, which are positioned at the corner portion of the case 12 which is usually disadvantageous in terms of strength and which easily impact the ground or the like due to the case 12 being dropped, are strongly joined together. Even if the case 12 is dropped, there is no deformation, buckling, or positional offset due to the entire weight of the recording tape cartridge 10.

Further, at the area where the pin stands 24 are set (the vicinity of the opening 20), the plate thickness is 2.4 mm at both the upper case 16 and the lower case 18, which is thick as compared with the other areas (which have an average plate thickness of 2 mm). Moreover, the case 12 (the upper case 16 and the lower case 18) is formed of a polycarbonate (PC) material which has high mechanical strength. Note that, instead of PC, the case 12 may be formed of acrylonitrile-butadiene-styrene (ABS) or a metal material.

This is in order to increase the strength in the vicinities of the pin holding portions 24 which are the holding (positioning) positions of the leader pin 22 which are most important to the functioning of the recording tape cartridge 10 (in order for the leader pin 22 to be correctly engaged by the pull-out means at the time when the recording tape is pulled out), and is so that positional offset of the leader pin 22 does not arise due to impact when the case 12 (the recording tape cartridge 10) is dropped or the like.

The positions at which the pin stands 24 are set are determined to be further toward the inner side of the case 12 than an imaginary line (not illustrated) which connects the axial centers of the screw bosses 32, 36 which are positioned at the front and rear edge portions of the opening 20. Moreover, in the present embodiment, the pin stands 24 are disposed nearer to the screw bosses 32 than the screw bosses 36. In this way, positional offset of the leader pin 22 due to vibrations of the ceiling plate 16B and the bottom plate 18B when the case 12 is dropped or the like is prevented.

At the case 12, the peripheral wall 16A of the upper case 16 and the peripheral wall 18A of the lower case 18 are formed to the same heights, and the machining accuracies of the portions thereof which oppose one another (the accuracies of resin molding by a mold) are the same level. Thus, the case 12 has good assemblability and good drop impact resistance. Moreover, the torsional strength of the case 12 is improved by providing the concave portions 48A, 48B, the cell retention notch 60 (which will be described later), and, as needed, other concave portions and the like.

The angle of inclination, with respect to the direction of arrow A, of the plane of opening of the opening 20 (the angle of inclination of the ceiling plate 16B and the bottom plate 18B of the case 12 which prescribe the top and bottom of the opening 20) is determined in accordance with the need to identify (recognize) the recording tape cartridge 10 at a library device. Namely, a library device is a device which accommodates a plurality of the recording tape cartridges 10, and automatically (i.e., without being aided by a human hand) loads and removes the recording tape cartridges 10 into and from drive devices. When there are plural types of recording tape cartridges 10 which are being handled and plural types of drive devices, there is the need to recognize the generations or the recording capacities or the like of the recording tape cartridges 10. The angle of inclination of the plane of opening of the opening 20 can be used for such recognition.

The opening 20 for pulling-out of the magnetic tape T, which has been formed by taking strength into consideration as described above, also serves as a recognition portion at a library device in accordance with the angle of inclination of the plane of opening of the opening 20 (specifically, the angle of inclination of the ceiling plate and the bottom plate which prescribe the top and bottom of the opening 20). Thus, it is possible to prevent the strength of the case 12 from being insufficient, the dustproof quality of the case 12 from deteriorating, and the structure of the mold from becoming complex, which would be of concern if the opening 20 and the recognition portion were provided separately (e.g., if one or plural through holes were formed in the case 12 as recognition portions).

As described above, the opening 20 is formed by cutting off the front right corner portion of the case 12. The plane of opening of the opening 20 is thereby directed in the direction of arrow A and in the direction of arrow B (the plane of opening is inclined with respect to the direction of arrow A). Thus, the pull-out means of a drive device can access and engage the leader pin 22 from the direction of arrow A, or from the direction of arrow B, or from between the direction of arrow A and the direction of arrow B. In this way, the area over which the pin stands 24 which hold the leader pin 22 can be set is broadened, and the region at which the pull-out means of the drive device can engage the leader pin 22 is broadened. Thus, the positions where the pin stands 24 are set can be determined in accordance with the specifications of the drive device which engages the leader pin 22 from the direction of arrow A or from the direction of arrow B. Moreover, because the locus of movement of the door 50, which will be described later, does not interfere with positions at which the leader pin 22 can realistically be set, the degrees of freedom in designing the drive device are increased.

If the pull-out means of the drive device can access the leader pin 22 from the front surface side of the case 12 which faces in the direction of arrow A, the path for pulling-out the magnetic tape T can be made to be the shortest, and there is no need for a drive mechanism for making the pull-out means circle around from the arrow B side of the case 12. Thus, the drive device can be made to be more compact and less expensive. Further, when the path for pulling-out the magnetic tape T is made to be the shortest as described above, the path of the magnetic tape T also is short as a matter of course. Thus, the contact wear of the magnetic tape T and a tape guide (e.g., a roller which is rotatably supported or the like) can be decreased.

(Structure of Door)

The above-described opening 20 is opened and closed by the door 50 which serves as a shielding member. As shown in FIG. 7A, the door 50 is formed in an arc-shape which curves along the direction of plate thickness thereof, and whose curvature as seen in plan view coincides with the curvature of the guide grooves 42 (the predetermined circumference). Further, as shown in FIG. 7B, the portion of the door 50 at the front portion thereof (at least the portion thereof which closes the opening 20) where the plate width (height) is formed to be substantially equal to the opening height of the opening 20, is a closing portion 50A. The portion of the door 50 which is at the rear side of the closing portion 50A and whose plate width is slightly smaller than that of the closing portion 50A, is a driving portion 50B.

Figure 8:
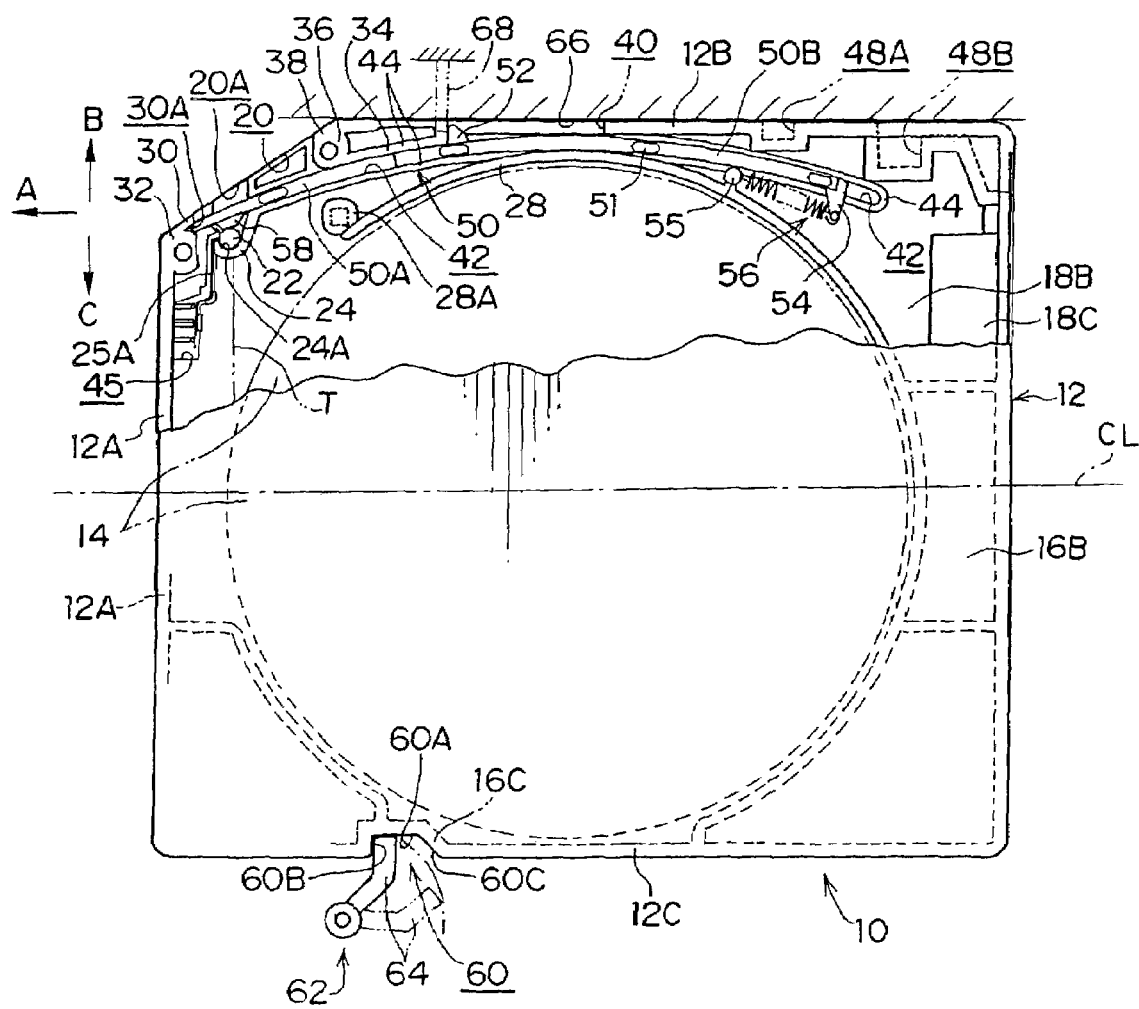
FIG. 8 is a plan view, a portion of which is removed, showing a state before an opening of the recording tape cartridge relating to the embodiment of the present invention is opened by a drive device.

The plate length of the door 50 (the curved longitudinal dimension thereof) is determined such that, in the state in which the door 50 closes the opening 20, the rear end portion of the driving portion 50B is positioned in the right rear corner portion of the case 12 (see FIG. 8). Note that the bottom rear portion of the driving portion 50B is cut obliquely in order to avoid the memory board M which is disposed obliquely at the rear wall 18C of the lower case 18.

The door 50 closes the opening 20 (see FIG. 8) in a state in which the distal end portion of the closing portion 50A enters into the concave portions 30A which are positioned at the outer sides of the screw bosses 32. When the door 50 moves (rotates) substantially rearward along the guide grooves 42 so as to open the opening 20 (see FIG. 9) and the outer peripheral surface of the distal end of the closing portion 50A reaches a vicinity of the inner sides of the screw bosses 36, the opening 20 is completely opened (see FIG. 10). Further, the door 50 closes the opening 20 by rotating in the direction substantially opposite to the direction at the time of opening the opening 20.

In this way, the door 50 is curved so as to open and close the opening 20 by rotating without jutting out from the predetermined circumference which is the locus of movement of the door 50. It suffices for the center of rotation and the radius of the door 50 (the configuration of the guide grooves 42) to be appropriately determined in accordance with the angle of the plane of opening of the opening 20 which is determined by the requirements of the library device, or in accordance with the positions of the front and rear edge portions of the opening 20 (the screw bosses 32, 36) which are determined by the requirements of the drive device, or the like.

Further, a plurality of the convex portions 51, which enter into the upper and lower guide grooves 42, project at the upper and lower ends of the door 50. The projecting heights of the convex portions 51 differ at the closing portion 50A and the driving portion 50B. However, the distance from the central line in the widthwise direction of the door 50 (the central line along the longitudinal direction of the door 50) to the peak portion of each convex portion 51 is constant. In this way, the top and bottom convex portions 51 slide along the ceiling plate 16B or the bottom plate 18B which are the bottom portions of the guide grooves 42.

Projections 51A, whose peak portions run along the end surfaces in the direction of the plate thickness of the door 50, project at the both sides, in the direction of plate thickness of the door 50, of each convex portion 51. The projections 51A slide along the groove walls (the ribs 44 and the like) of the guide grooves 42. Note that the convex portion 51 which is positioned furthest toward the front is disposed such that, when the opening 20 is being opened or closed, this convex portion 51 does not enter into the taper opening 20A which is continuous with the guide groove 42.

At the time when the door 50 is opening and closing the opening 20, the door 50 is guided in the guide grooves 42 by the convex portions 51 and the projections 51A, and does not jut out from the aforementioned locus of movement. The door 50 twists its way through at the outer sides of the screw bosses 32 and the inner sides of the screw bosses 36 and between the right wall 12B and the play restricting walls 28, and reliably opens the opening 20.

The operation projection 52, which serves as an operation portion, projects along the radial direction of the door 50 at the outer peripheral portion, in a vicinity of the front end (the closing portion 50A side) of the driving portion 50B of the door 50. The operation projection 52 is exposed to the exterior of the case 12 from the slit 40, and is positioned so as to be set apart slightly from the connecting wall 34A of the upper case 16 when the opening 20 is in a closed state, and can be operated from the portion of the slit 40 which is open toward the front at the cut portions of the bent walls 38. The dimensions of the respective portions are determined (see FIG. 8) such that, in this state, the distal end portion of the operation projection 52 does not project further than the outer surface of the right wall 12B (the region of the outer shape of the case 12). The connecting walls 34A are inclined so as to substantially coincide with the longitudinal direction of the operation projection 52.

On the other hand, in the state in which the opening 20 is open, the operation projection 52 is positioned so as to be set apart slightly from the rear edge of the slit 40. Note that the dimensions of the respective portions are determined such that, in this state, the longitudinal direction of the operation projection 52 is substantially orthogonal to the right wall 12B of the case 12 (is substantially orthogonal to the direction of arrow A) (see FIG. 10).

Further, the interior and exterior of the case 12 communicate through the slit 40 for exposing the operation projection 52. However, the adhesion of dust and the like to the magnetic tape T wound on the reel 14 is prevented by the slit 40 always being substantially closed due to, at the front side thereof, the door 50 (which extends along substantially the entire height within the case 12) and the arc-shaped walls 34 being extremely close to the slit 40 along a predetermined length, and, at the rear side thereof, the door 50 and the right wall 12B being adjacent.

The substantially L-shaped spring catching portion 54 projects toward the inner surface side of the door 50 at the rear end portion of the driving portion 50B of the door 50. The upper side of the spring catching portion 54 is the free end thereof. The spring catching portion 54 is for anchoring and holding the coil spring 56 serving as an urging means. Specifically, the annular portions 56A, 56B for anchoring are provided at the end portions of the coil spring 56. The spring catching pins 55 of the case 12 are inserted through the annular portion 56A such that the annular portion 56A is anchored and held at the case 12. The spring catching portion 54 is inserted through the annular portion 56B such that the annular portion 56B is anchored and held at the door 50 (see FIG. 8).

In this way, the door 50 is urged in the direction of closing the opening 20 by the urging force of the coil spring 56, and usually closes the opening 20. The coil spring 56 has a length which reaches the rear right corner portion of the case 12 in the state in which the door 50 closes the opening 20 as described above. Therefore, the space between the play restricting walls 28 and the peripheral walls 16A, 18A (the rear wall 18C) at this rear right corner potion can be utilized effectively.

Stoppers 58, which abut the upper end portion side surface and the lower end portion side surface of the leader pin 22 when the opening 20 is closed, project at the inner surface of the closing portion 50A of the door 50. The stoppers 58 can reliably prevent the leader pin 22 from falling out from the pin stands 24 due to the impact of a drop or the like. Moreover, the inner surface and/or the outer surface at the distal end of the closing portion 50A of the door 50 is preferably formed in a tapered configuration such that this distal end can smoothly enter into the concave portions 30A. Tapered surfaces are formed at both the inner and outer surfaces at the door 50 of the present embodiment.

The above-described door 50 is formed of, for example, polyoxymethylene (POM) resin which has excellent wear resistance and a low coefficient of friction, as compared with the case 12 which is formed of PC. However, the operation projection 52 and the spring catching portion 54 may be formed by separate members (i.e., of different materials). Further, the convex portions 51 and the projections 51A may be formed integrally with the door 50 which is formed of POM. Or, the convex portions 51 and the projections 51A may be formed separately from the main body (the closing portion 50A and the driving portion 50B) of the door 50. When the convex portions 51 and the projections 51A are formed separately from the main body of the door 50, they may be formed of a resin material such as polyamide (PA), polytetrafluoroethylene (PTFE), polyethylene (PE), or the like, or a metal material, or of materials which have these materials as the main component. However, when the case 12 is formed of a metal material, the convex portions 51 and the projections 51A must be formed of a resin material in consideration of the wear resistance and prevention of noise.

The above-described door 50 opens the opening 20 by moving with respect to the case 12 against the urging force of the coil spring 56 due to the operation projection 52 engaging an engagement projection 68 of a drive device due to the operation of the recording tape cartridge 10 being loaded into the drive device. The door 50 closes the opening 20 due to urging force of the coil spring 56 at the time when the recording tape cartridge 10 is ejected from the drive device. The door 50, which is curved in an arc-shape, opens and closes the opening 20 by circling around the outer sides of the reel 14 and the pin stands 24 (the leader pin 22), without jutting out from the locus of movement which runs along the curved configuration of the door 50. The door 50 does not jut out from the region of the outer shape of the case 12 at the time of opening and closing the opening 20. Accordingly, the space for accommodating the recording tape cartridge 10 within a drive device can be made to be small.

(Structure of Cell Retention Notch)

The case 12 is provided with the cell retention notch 60 which serves as the "concave portion" in the present invention. As shown in FIGS. 2 and 3, the cell retention notch 60 is provided slightly further forward than the front-back direction central portion of the arrow C side end portion of the upper case 16 (the side portion which is, in the left-right direction, opposite the side at which the opening 20 is provided). The cell retention notch 60 opens upwardly and to the left at the ceiling plate 16B of the upper case 16 and at a left wall 12C of the case 12. (The left wall 12C is, among the peripheral walls 16A, 18A, the left-side side walls thereof which run along the direction of arrow A.)

The cell retention notch 60 is formed in a substantially trapezoidal shape as seen in plan view, and has four surfaces which face toward the outer side of the case 12. Among these four surfaces, three surfaces face in the horizontal direction. Among these three surfaces, the surface directed toward the arrow C side and running along the direction of arrow A is a push surface 60A, the surface directed toward the rear side (the side opposite arrow A) and substantially orthogonal to the direction of arrow A is an engagement surface 60B, and the surface which is positioned at the side opposite the engagement surface 60B and which is inclined in a direction of increasing the opening width (the opening length) at the left wall 12C is an inclined surface 60C.

By making the drafts of the push surface 60A and the engagement surface 60B small (e.g., substantially 0.5°, as compared with a draft of 2° of the front wall 12A which forms the design surface), the push surface 60A and the engagement surface 60B are surfaces which are substantially orthogonal (are directed slightly upward) with respect to the direction of arrow A. When the door 50 opens the opening 20, the push surface 60A and the engagement surface 60B abut (either push or engage) a pushing/engaging member 64 of the drive device (both of which will be described later).

On the other hand, the angle of inclination of the inclined surface 60C is determined in consideration of the advance and withdrawal of the pushing/engaging member 64 into and from the cell retention notch 60. In the present embodiment, the angle of inclination of the inclined surface 60C is determined such that, supposing that the play restricting wall 28 were to extend to the position of a wall portion 16C forming the inclined surface 60C, the wall portion 16C would substantially coincide with a direction tangential to the play restricting wall 28 at that position. In this way, the cell retention notch 60 is disposed so as to not interfere with the reel 14 in the reel area in which the reel 14 is provided, and is positioned further rearward than the screw bosses 36 positioned at the rear edge of the opening 20 (is positioned so as to be as near to the front-back direction central portion as possible). Thus, when the push surface 60A is pushed in the direction of arrow B, the case 12 is maintained in a state in which the right wall 12B thereof abuts an abutment surface 66 (to be described later) of a bucket (i.e., the case 12 does not rotate around the corner portion of the bent walls 38).

The corner portions of the case 12 (the corner portions of the top end of the peripheral wall 16A and the ceiling plate 16B, and the corner portions of the peripheral wall 18A and the bottom plate 18B are all subjected to rounding processing. The top-bottom direction and the sideways direction depths of the cell retention notch 60 are set to be greater than this R diameter. A sufficient surface area over which the push surface 60A and the engagement surface 60B can abut the pushing/engaging member 64 is ensured, and the degrees of freedom in designing the case 12 do not deteriorate.

Moreover, the bottom surface of the cell retention notch 60 reaches a vicinity of the bottom edge of the peripheral wall 16A. The height (the top-bottom direction position) at which the push surface 60A and the engagement surface 60B abut the pushing/engaging member 64, and the height at which the operation projection 52 exposed from the slit 40 engages the engagement projection 68, coincide with one another. In this way, if the slit 40 is disposed above the parting line PL and the cell retention notch 60 (the push surface 60A and the engagement surface 60B) are provided only at the upper case 16, the aforementioned respective heights of engagement can be made to coincide with one another. It is possible to prevent the problematic formation of a slight step at the abutting portions of upper and lower portions of the push surface 60A and the engagement surface 60B, which would be of concern if the push surface 60A and the engagement surface 60B were formed by the upper case 16 and the lower case 18 being brought into contact with one another.

Due to the cell retention notch 60 being open upwardly and toward the left, the range of directions over which the pushing/engaging member 64 of the drive device can access the push surface 60A and the engagement surface 60B is broadened, the degrees of freedom in designing the drive device are increased, and the moldability of the upper case 16 is good.

Next, operation of the present embodiment will be described.

When the recording tape cartridge 10 having the above-described structure is not being used (i.e., is being stored, is being transported, or the like), the opening 20 is closed by the door 50. Specifically, due to the urging force of the coil spring 56, the distal end portion (front end portion) of the door 50 enters into the concave portions 30A. The outer peripheral surface of central portion of the door 50 substantially contacts the outer peripheral surfaces of the inner sides of the screw bosses 36 and the inner peripheral walls of the arc-shaped walls 34, and the door 50 closes the opening 20.

When the magnetic tape T is to be used, the recording tape cartridge 10 is inserted along the direction of arrow A into a bucket which serves as a cartridge accommodating means forming a drive device (i.e., the recording tape cartridge 10 is loaded into the drive device). When the recording tape cartridge 10 is inserted to a predetermined depth in the bucket, as shown in FIG. 8, a locked state, in which the pushing/engaging member 64 of a positioning means 62 provided at the bucket is maintained at the position shown by the imaginary line, is cancelled by, for example, a lock releasing mechanism abutting the case 12. The pushing/engaging member 64 is rotated around a shaft by the urging force of an unillustrated spring or the like, and enters, from the left, into the cell retention notch 60 of the case 12.

Then, due to the longitudinal direction of the pushing/engaging member 64 being inclined with respect to the direction of arrow B, the component force of the urging force in the direction of the aforementioned rotation acts in the direction of arrow B. The pushing/engaging member 64 pushes the push surface 60A in the direction of arrow B so as to push the right wall 12B of the case 12 against the abutment surface 66 of the bucket (i.e., moves the case 12 toward one side). Then, when the pushing/engaging member 64 engages with the engagement surface 60B, the pushing/engaging member 64 is locked at that position, this engaged state is maintained, and the right wall 12B is prevented from moving away from the abutment surface 66. In this way, the case 12 (i.e., the recording tape cartridge 10) is positioned such that it cannot be pulled out from the bucket.

In place of the structure in which the right wall 12B of the case 12 abuts the abutment surface 66, it is possible for a stacking rib, which is provided along the direction of arrow A at a position of the bottom surface of the bottom plate 18B which position corresponds to the left-right direction central portion of the opening 20, to be pushed against a guide groove of the bucket or the like. (Neither the stacking rib nor the guide groove is illustrated.)

In this state, the bucket, together with the recording tape cartridge 10, moves in the direction of arrow A within the drive device. Accompanying this movement (the operation of loading into the drive device, i.e., the relative movement with respect to the drive device), the engagement projection 68, which serves as an opening/closing member forming an opening/closing means of the drive device, enters into the slit 40 which opens toward the front at the cut-out portion of the bent wall 38, and engages with the operation projection 52 of the door 50.

Figure 9:
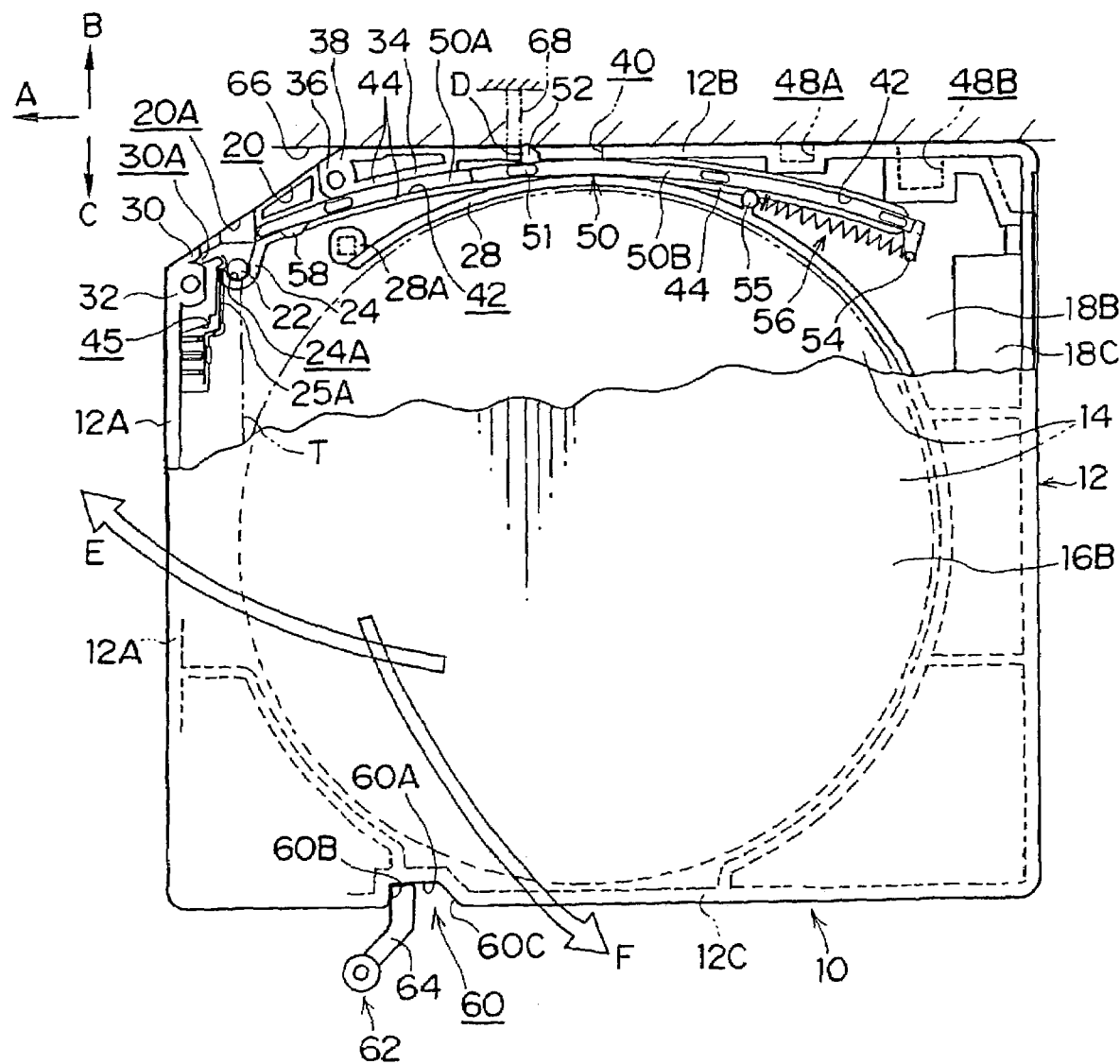
FIG. 9 is a plan view, a portion of which is removed, showing a state in the midst of the opening of the recording tape cartridge relating to the embodiment of the present invention being opened by the drive device.

When the bucket, together with the recording tape cartridge 10 (the case 12), moves further in the direction of arrow A, as shown in FIG. 9, due to the moving force, the engagement projection 68 moves the operation projection 52 substantially rearward against the urging force of the coil spring 56 (i.e., the operation projection 52 moves substantially rearward relative to the case 12 which is moving in the direction of arrow A). Thus, the door 50, from which the operation projection 52 projects, rotates clockwise in plan view along the direction of curving of the guide grooves 42 while being guided by the guide grooves 42 (i.e., moves substantially rearward so as to circle around the outer sides of the pin stands 24 and the reel 14), and opens the opening 20.

At this time, a rotational moment around a region D of engagement between the operation projection 52 and the engagement projection 68, which rotational moment is caused by the reaction force of the above-described moving force (i.e., a moment in the direction of arrow E in FIG. 9) acts on the case 12. However, the pushing/engaging member 64 which is locked maintains the state of abutment of the right wall 12B (i.e., the portion of the right wall 12B further forward than the engagement region D) and the abutment surface 66 of the bucket (i.e., the pushing/engaging member continues to push the right wall 12B against the abutment surface 66). Thus, a moment in the direction of arrow F which opposes (is in equilibrium with) the rotational moment in the direction of arrow E acts on the case 12, and the rotational moment in the direction of arrow E is offset.

In this way, the case 12 does not rotate around the region D of engagement of the operation projection 52 of the door 50 and the engagement projection 68, and does not tilt with respect to the direction of arrow A. Further, due to the pushing/engaging member 64 engaging the engagement surface 60B, movement of the case 12 in the direction of being pulled out from the bucket is restricted, and the right wall 12B (which is at the side at which the opening 20 is provided) abuts the abutment wall 66. Thus, positional offset, which is more than that which is permitted, of the region where the opening 20 is set with respect to the bucket (drive device) is prevented.

Figure 10:
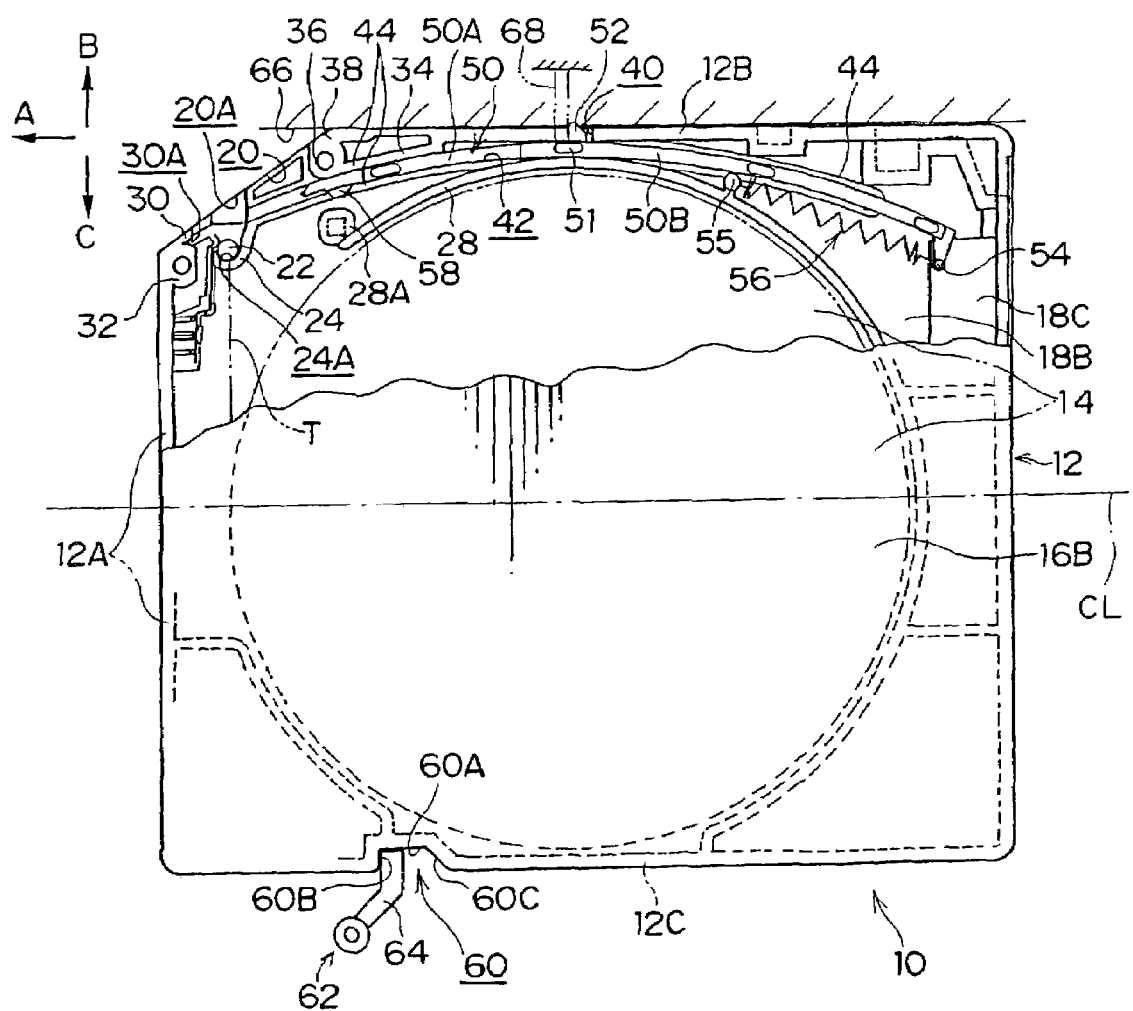
FIG. 10 is a plan view, a portion of which is removed, showing a state in which the opening of the recording tape cartridge relating to the embodiment of the present invention has been opened by the drive device.

When the bucket is moved a predetermined amount in the direction of arrow A, i.e., when the case 12 (the recording tape cartridge 10) is loaded to a predetermined depth in the drive device, as shown in FIG. 10, the opening 20 is completely opened. At this time, further rotation (substantially rearward movement) of the door 50 is restricted due to the convex portions 51, which are positioned furthest toward the rear at both the top and bottom, abutting the closed rear end portions of the ribs 44C.

In this state, when the recording tape cartridge 10 is positioned within the drive device, the pull-out means of the drive device enters into the case 12 from the opening 20 which has been opened. The pull-out means pulls-out the leader pin 22 which is positioned and held at the pin stands 24, and accommodates the leader pin 22 at a take-up reel. Due to the take-up reel and the reel 14 being driven to rotate synchronously, the magnetic tape T is successively pulled-out from the case 12 while being taken-up onto the take-up reel. Information is recorded or played back by a recording/playback head or the like disposed along a predetermined tape path.

On the other hand, when the magnetic tape T is rewound onto the reel 14 and the recording tape cartridge 10 is to be ejected from the drive device, the positioned state of the recording tape cartridge 10 is released, and the recording tape cartridge 10 is moved, together with the bucket, in the direction opposite to the direction of arrow A. Accompanying this movement, the door 50 is moved in the direction of closing the opening 20 by the urging force of the coil spring 56. When the distal end portion of the closing portion 50A of the door 50 enters into the concave portions 30A, the door 50 is returned to its initial state in which the opening 20 is completely closed.

Then, after this movement (the closing of the opening 20), the locked state of the pushing/engaging member 64 is released, and the pushing/engaging member 64 comes out from the cell retention notch 60. At this time, because the inclined surface 60C is provided at the cell retention notch 60, the pushing/engaging member 64 comes out without interfering with the corner portions or the like or the cell retention notch 60.

As described above, in the recording tape cartridge 10, the push surface 60A is pushed in the direction of arrow B (the case 12 is pushed against the abutment surface 66) by the positioning means 62 (the pushing/engaging member 64) of the drive device. In this way, the rotational moment at the time of opening the opening 20 is offset. Due to the pushing/engaging member 64 engaging the engagement surface 60B, the case 12 is prevented from moving in the pull-out direction.

Further, the case 12 is positioned with respect to the bucket due to the right wall 12B, which is in a vicinity of the opening 20, abutting the abutment surface 66. Therefore, the positional accuracy of the outer surface of the case 12 which is the design surface has little effect on the positional accuracy of the region, at which the opening 20 is set, with respect to the bucket (the main body of the drive device which is positioned later). Namely, due to the cell retention notch 60, which is provided at the left wall 12C side, being pushed or the like, the positional accuracy of the case 12 with respect to the bucket is improved while the state, in which the aforementioned rotational moment is offset, is maintained.

In this way, in the recording tape cartridge 10 relating to the present embodiment, when the door 50 is moved in the direction of opening the opening 20 by the operation of loading the recording tape cartridge 10 into a drive device, positional offset of the case 12 with respect to the drive device can be prevented.

The push surface 60A and the engagement surface 60B are formed within the cell retention notch 60 which is one concave portion. Thus, the number of concave portions provided at the case 12 does not increase, and the moldability of the case 12 is maintained. Further, it is possible to form, at the drive device, the simple structure having the positioning means 62 which has both the function of pushing the push surface 60A and the function of engaging the engagement surface 60B.

Note that, in the present embodiment, the opening 20 is opened by the recording tape cartridge 10, together with the bucket, moving relatively with respect to the drive device. However, the opening 20 may be opened by relative movement of the recording tape cartridge 10 with respect to the bucket (the operation of inserting the recording tape cartridge 10 into the bucket). In this case, when the recording tape cartridge 10 is inserted to a predetermined depth in the bucket, the positioning means 62 makes the pushing/engaging member 64 enter into the cell retention notch 60, and thereafter, moves together with the recording tape cartridge 10 relative to the bucket. Further, the abutment surface 66 may move integrally with the positioning means 62, or may be fixed to the bucket.

The positioning means 62 is not limited to the preferable structure in which it has both the function of pushing the push surface 60A and the function of engaging the engagement surface 60B. These functions may be realized by separate structures.

Moreover, the cell retention notch 60 of the recording tape cartridge 10 may be used for positioning in a library device 70 which serves as an automatic cartridge conveying device. First, an example of a library device 70 will be described on the basis of FIG. 11.

Figure 11:
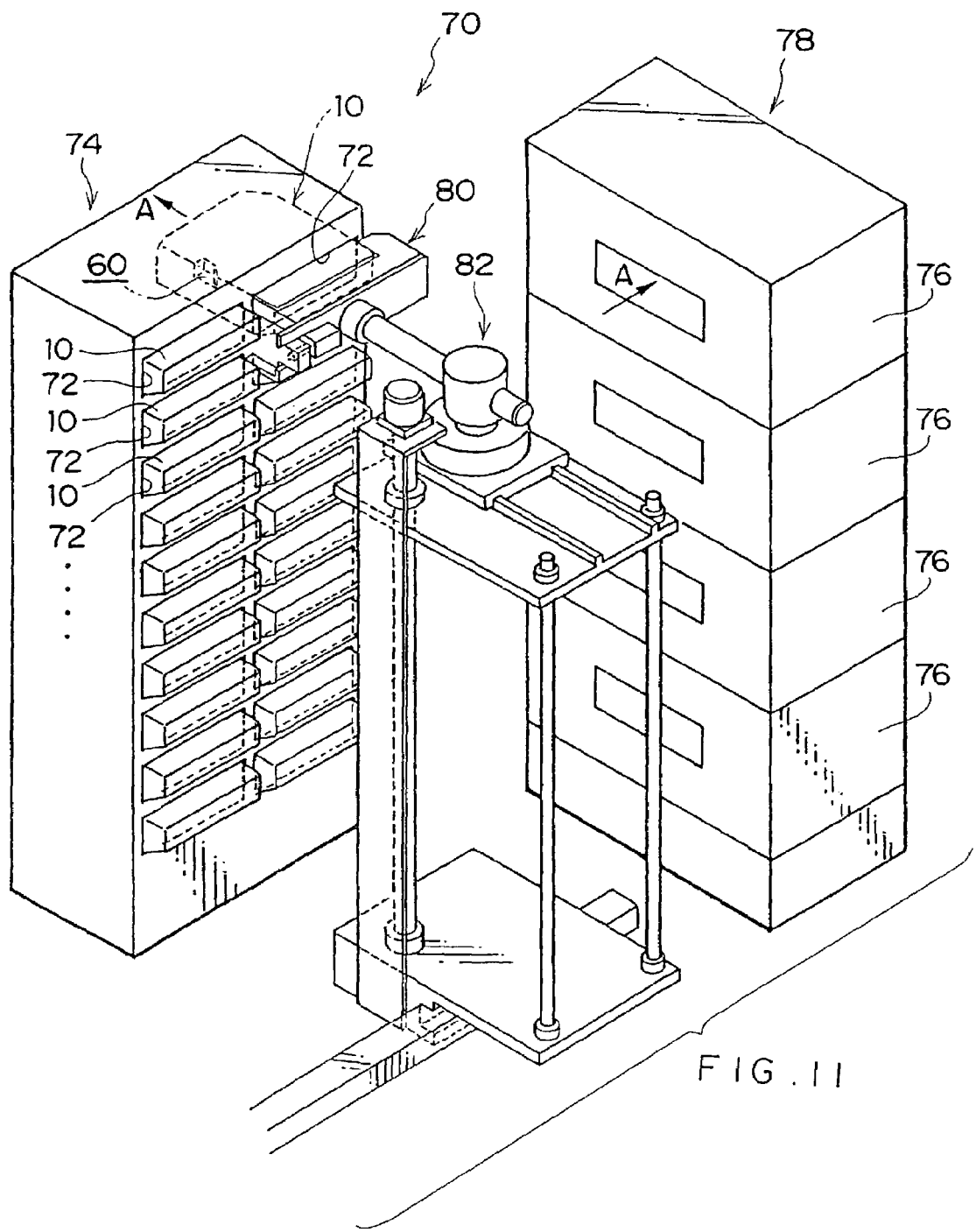
FIG. 11 is a perspective view showing the schematic structure of a library device in which the recording tape cartridge relating to the embodiment of the present invention is used.

As shown in FIG. 11, the library device 70 is formed to include an accommodating rack portion 74 having a plurality of holder portions (magazines) serving as accommodating portions which can each accommodate the recording tape cartridge 10; a recording/playback section 78 at which one or plural drive devices 76 are provided (in the present embodiment, there are four drive devices 76); and a moving mechanism section 82 which can move a chucking mechanism 80, which can grasp the rear end side portions (e.g., the pair of left and right concave portions 48B) of the recording tape cartridge 10, between the respective holder portions 72 and the respective drive devices 76.

At the library device 70, the recording tape cartridge 10 which is to be used is pulled-out from the holder portion 72 by the chucking mechanism 80 and the moving mechanism section 82, and is loaded into the drive device 76 of the recording/playback section 78. The recording tape cartridge 10 which has been used is pulled-out from the drive device 76 by the chucking mechanism 80 and the moving mechanism section 82, and is accommodated (loaded) in the holder portion 72 of the accommodating rack section 74.

In this way, a plurality (a large number) of accommodated recording tape cartridges 10 can automatically and rapidly be removed from and loaded into the drive devices 76, such that a large-scale (large-capacity) information backup system is constructed. Further, the library device 70 handles plural types of recording tape cartridges including the recording tape cartridge 10, and is formed to have the holder portions 72 and the drive devices 76 of specifications which differ in accordance with the types of the recording tape cartridges.

Figure 12:
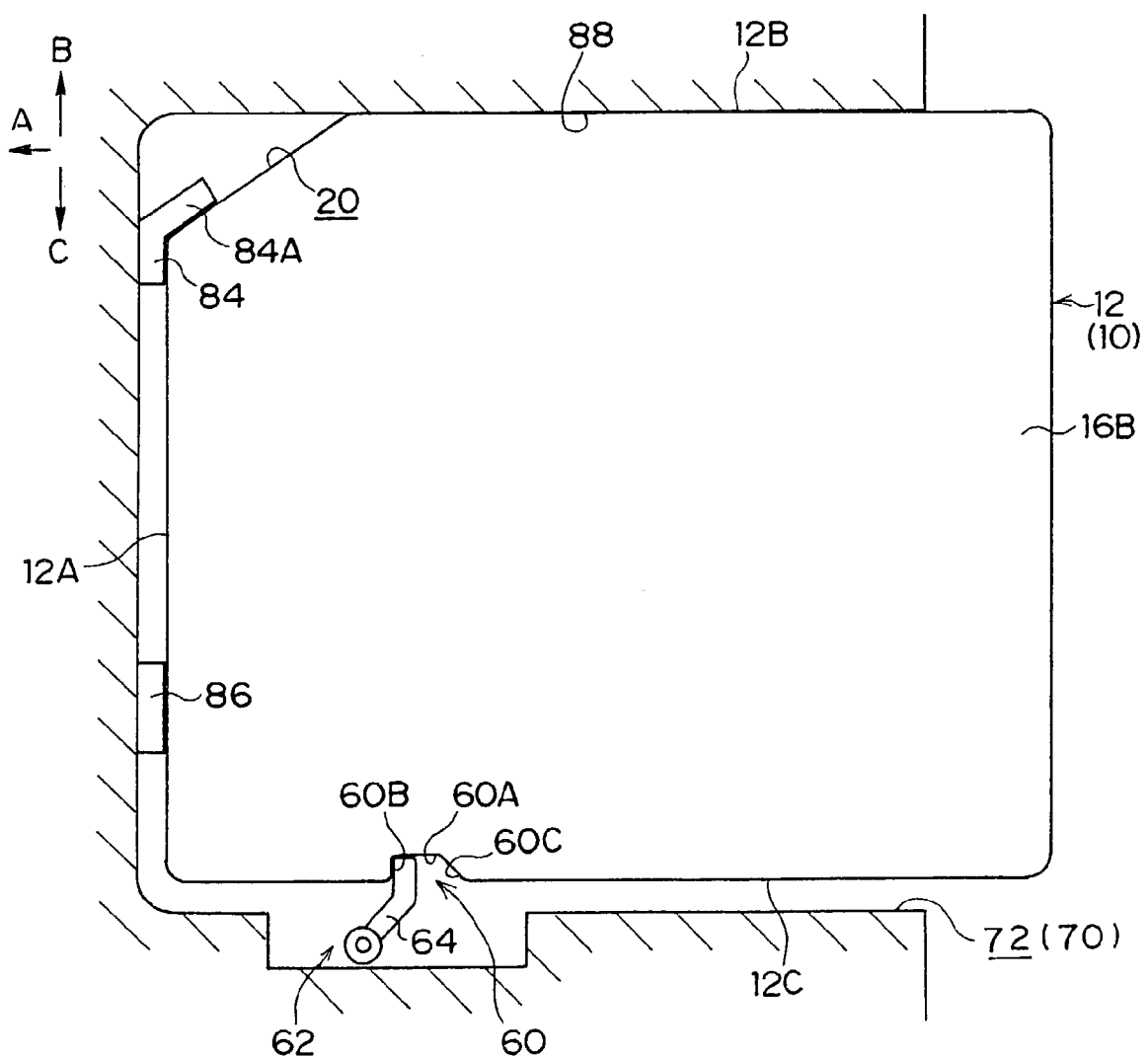
FIG. 12 is a plan view showing a state in which the recording tape cartridge relating to the embodiment of the present invention is positioned within a holder portion of the library device.

As shown in FIG. 12, a pair of top and bottom positioning stoppers 84, 86, which serve as references for front-back direction positioning, are provided at the deepest portion of interior of the holder portion 72 which serves as a cartridge accommodating means forming the library device 70. The positioning stopper 84 at the right side (the opening 20 side) has an inclined portion 84A which corresponds to the plane of opening of the opening 20 of the case 12. A right inner surface 88 of the holder portion 72 is a reference for left-right direction positioning. The positioning means 62, which is structured in the same way as that of the drive device, is provided at the left end portion within the holder portion 72.

When the recording tape cartridge 10 is accommodated to a predetermined depth within the holder portion 72 of the library device 70 by the chucking mechanism 80 and the moving mechanism section 82, the front wall 12A of the case 12 abuts the stoppers 84, 86. In this state, the pushing/engaging member 64 of the positioning means 62 enters into the cell retention notch 60. Then, in the same way as in the above-described case of the drive device, the pushing/engaging member 64 pushes the push surface 60A in the direction of arrow B, and thereafter, engages the engagement surface 60B.

In this way, the right wall 12B of the case 12 abuts the right inner surface 88, and the front right corner portion of the case 12 which is cut along the plane of opening of the opening 20 (the ceiling plate 16B and/or the bottom plate 18B which prescribe the upper and lower ends of the opening 20) abuts the inclined portion 84A of the positioning stopper 84. Namely, the case 12 is positioned in the front-back direction and in the left-right direction with respect to the holder portion 72, the case 12 is prevented from falling out (i.e., coming out) from the holder portion 72, and positional offset of the case 12 with respect to the holder portion 72 is prevented.

Note that an identifying means for identifying the angle of inclination (the presence/absence of contact, the distance, or the like) of the plane of opening of the opening 20 of the case 12 is provided at the positioning stopper 84 within the holder portion 72 or in a vicinity thereof. When a recording tape cartridge which does not correspond to that holder portion 72 is accommodated, the identifying means outputs a signal to eject that recording tape cartridge by the chucking mechanism 80 and the moving mechanism section 82. In this way, due to the pushing/engaging member 64 pushing the push surface 60A and the engagement surface 60B of the cell retention notch 60, the front right corner portion of the case 12 abuts the inclined surface 84A of the positioning stopper 84 and is reliably positioned. Therefore, the identifying means can reliably identify the recording tape cartridge 10, by using the angle of inclination of the plane of opening of the opening 20.

In this way, by using a structure in which the cell retention notch 60 is used for positioning within the holder portion 72 of the library device 70 and for preventing falling-out, the number of concave portions provided in the case 12 can be reduced. Accordingly, the configuration of the case 12 (the mold for molding the upper case 16) can be simplified, and an increase in mold separation resistance can be suppressed. Moreover, the positioning means 62 is ideal as it can be used in common at both a drive device and at the library device 70. Note that, for example, it is also possible to use the cell retention notch 60 only at the drive device, or only at the holder portion 72 of the library device 70.

In the above-described embodiment, the recording tape cartridge 10 has the preferable structure of having the opening 20 which is inclined with respect to the direction of arrow A, and the door 50 which corresponds to an arc-shaped locus of movement. However, the present invention is not limited to the same. The cell retention notch 60 can be applied as well to the recording tape cartridge 10 which has a door (a shielding member) and an opening of any structure in which, due to the recording tape cartridge 10 being loaded into a drive device, the opening 20 is opened and a rotational moment is applied during this opening process. Accordingly, for example, the recording tape cartridge 10 may have an opening which passes through the right wall 12B of the case 12, and a door which opens and closes this opening by sliding along the direction of arrow A. Further, the operation projection 52 may be exposed to the exterior from a slit provided in the bottom plate 18B of the case 12.

In the above-described embodiment, the magnetic tape T is used as the recording tape. However, the present invention is not limited to the same. It suffices for the recording tape to be interpreted as an information recording/playback medium which is shaped as an elongated tape and on which information can be recorded and from which recorded information can be played back. It goes without saying that the recording tape cartridge relating to the present invention can be applied to recording tapes of any recording/playback systems.

Moreover, in the above-described embodiment, the pushing/engaging member 64 of the positioning means 62 enters into the cell retention notch 60 by rotating along a horizontal plane. However, the present invention is not limited to the same. For example, the pushing/engaging member 64 may enter into the cell retention notch 60 by rotating along a vertical plane (diagonally from the left and the rear). In this case, the inclined surface 60C may be inclined so as to widen the upwardly-facing opening portion of the cell retention notch 60, within a range in which the wall portion 16C does not interfere with the reel 14. Moreover, provided that the inclined surface 60C permits the advance and the withdrawal of the pushing/engaging member 64, the inclined surface 60C may be a flat surface or may be a curved surface.

As described above, the recording tape cartridge relating to the present invention has the excellent effect that positional offset of a case with respect to a cartridge accommodating means can be prevented.

What is claimed is:

1. A tape cartridge which can be inserted into a tape drive having an opening member and an engagement member which can operatively engage the tape cartridge when the tape cartridge is inserted in the tape drive, the tape cartridge comprising:
   (a) a case;
   (b) a tape access opening provided on a first side of the case, the first side being located completely to one side of a center line of the case, the center line extending in a cartridge insertion direction;
   (c) a shielding member able to move reciprocally between a closing position for closing the tape access opening and an opening position for opening the tape access opening;
   (d) an operation portion which is configured to cooperate with the opening member of the tape drive to move the shielding member toward the opening position when the cartridge is inserted; and
   (e) a concave portion provided at a second side of the case configured to cooperate with the engagement member of the tape drive when the cartridge is inserted, and the concave portion has a push surface, an engagement surface and an inclined surface, wherein the second side of the case is a side of the case opposite the first side of the case,
   wherein the engagement surface, the push surface, and the inclined surface are positioned in that order from a front side toward a rear side in the cartridge insertion direction;
   the engagement surface extends in a vertical direction which is substantially orthogonal to the cartridge insertion direction;
   the push surface is substantially parallel to the cartridge insertion direction; and
   the inclined surface obliquely intersects the cartridge insertion direction, and
   wherein the tape cartridge is configured to be inserted into and removed from a predetermined device other than the tape drive, and wherein the concave portion is configured to be engaged by a pushing member of the predetermined device when the cartridge is inserted in the predetermined device in order to position the cartridge.

2. The tape cartridge of claim 1, wherein, when the cartridge is inserted, the concave portion is configured to cooperate with the engagement member of the tape drive to exhibit a function of counterbalancing movement of the shielding member in a closing direction.

3. The tape cartridge of claim 1, wherein the predetermined device is an accommodating rack section for storing a plurality of cartridges contained in a library device.

4. The tape cartridge of claim 1, wherein the case has a front wall portion facing in the cartridge insertion direction, a side wall portion substantially parallel to the cartridge insertion direction, and an inclined wall portion which connects the front wall portion and the side wall portion and which is inclined with respect to the cartridge insertion direction, and the tape access opening is provided at the inclined wall portion.

5. The tape cartridge of claim 1, wherein the case has a side wall portion which is substantially parallel to the cartridge insertion direction, and the tape access opening is provided at the side wall portion.

6. The tape cartridge of claim 1, wherein the case has a slit which permits engagement of the opening member of the tape drive and the operation portion of the case when the cartridge is inserted.

7. The tape cartridge of claim 6, wherein the case is formed by an upper case and a lower case.

8. The tape cartridge of claim 7, wherein the concave portion and the slit are formed at one of the upper case and the lower case.

9. A tape drive into which a tape cartridge is inserted and from which the tape cartridge is removed, and which carries out at least one of reading of data and writing of data, the tape drive comprising:
   an opening member which can operatively engage with the tape cartridge when the tape cartridge is inserted; and an engagement member which can operatively engage with the tape cartridge when the tape cartridge is inserted, wherein the tape cartridge has (a) a case; (b) a tape access opening provided on a first side of the case, the first side begin located completely to one side of a center line of the case, the center line extending in a cartridge insertion direction; (c) a shielding member able to move reciprocally between a closing position for closing the tape access opening and an opening position for opening the tape access opening; (d) an operation portion which is configured to cooperate with the opening member of the tape drive to move the shielding member toward the opening position when the cartridge is inserted; and (e) a concave portion provided at a second side of the case configured to cooperate with the engagement member of the tape drive when the cartridge is inserted, and the concave portion has a push surface, an engagement surface and an inclined surface, wherein the second side of the case is a side of the case opposite the first side of the case; and wherein the engagement surface, the push surface, and the inclined surface are positioned in that order from a front side toward a rear side in the cartridge insertion direction;

the engagement surface extends in a vertical direction which is substantially orthogonal to the cartridge insertion direction;

the push surface is substantially parallel to the cartridge insertion direction; and the inclined surface obliquely intersects the cartridge insertion direction, and wherein the tape cartridge is configured to be inserted into and removed from a predetermined device other than the tape drive, and wherein the concave portion is configured to be engaged by a pushing member of the predetermined device when the cartridge is inserted in the predetermined device in order to position the cartridge.

10. The tape drive of claim 9, further comprising a bucket having one or more guide walls for guiding the tape cartridge.

11. The tape drive of claim 10, wherein the opening member of the tape drive is fixed to the bucket.

12. The tape drive of claim 10, wherein the engagement member of the tape drive is movably mounted to the bucket.

13. The tape drive of claim 9, wherein the opening member of the tape drive extends in a direction traversing a cartridge insertion direction.

* * * * *